US005616204A

United States Patent [19]
Duffy et al.

[11] Patent Number: 5,616,204
[45] Date of Patent: *Apr. 1, 1997

[54] TRANSFER HEAD FOR HOLDING HALF-CELL STRUCTURE

[75] Inventors: Joseph J. Duffy, Newark; Birol Kirayoglu, Wilmington; Pui-Yan Lin; Robert A. Marin, both of Hockessin, all of Del.; Robert J. Santucci, West Chester, Pa.

[73] Assignee: E. I. Du Pont de Nemours and Company, Wilmington, Del.

[ * ] Notice: The term of this patent shall not extend beyond the expiration date of Pat. No. 5,245,897.

[21] Appl. No.: 221,000

[22] Filed: Mar. 31, 1994

Related U.S. Application Data

[62] Division of Ser. No. 797,329, Nov. 25, 1991, Pat. No. 5,340,429.

[51] Int. Cl.⁶ .................................................... B32B 31/00
[52] U.S. Cl. .......................... 156/156; 156/285; 156/288; 156/558; 221/211; 414/793
[58] Field of Search .................................. 156/197, 292, 156/381, 382, 499, 497, 210, 548, 285, 286, 288, 156, 558; 414/793; 198/689.1; 221/211

[56] References Cited

U.S. PATENT DOCUMENTS

| | | | |
|---|---|---|---|
| 2,518,164 | 8/1950 | Meyer | 154/1 |
| 2,543,879 | 3/1951 | Stuckey | 156/292 |
| 2,581,421 | 1/1952 | Lombard et al. | 156/197 |
| 2,609,314 | 9/1952 | Engel et al. | 154/30 |
| 2,902,718 | 9/1959 | Martelli et al. | 18/19 |
| 3,044,921 | 7/1962 | Wentworth et al. | 156/205 |

(List continued on next page.)

FOREIGN PATENT DOCUMENTS

| | | |
|---|---|---|
| 0368238 | 5/1990 | European Pat. Off. . |
| 0507733 | 10/1992 | European Pat. Off. . |
| 1170732 | 1/1959 | France . |
| 1334371 | 8/1963 | France . |
| 1373515 | 9/1964 | France . |
| 2568513 | 2/1986 | France . |
| 1296347 | 5/1969 | Germany . |
| 3202473 | 8/1983 | Germany . |
| 4111846 | 11/1991 | Germany . |
| 312801 | 6/1929 | United Kingdom . |
| 905287 | 9/1962 | United Kingdom . |
| 1116935 | 6/1968 | United Kingdom . |
| 1116934 | 6/1968 | United Kingdom . |
| 2168396 | 6/1986 | United Kingdom . |
| WO90/04513 | 5/1990 | WIPO . |

*Primary Examiner*—James Engel

[57] ABSTRACT

The present invention relates to an apparatus and a process for a half-cell structure to make a hexagonal-cell honeycomb core. The structure has a plurality of peaks and valleys and a diagonal surface between each consecutive peak and valley. The apparatus comprises a stack holder for stacking the structure so that as one sheet is placed on top of a stack comprising at least one sheet, the peaks of one sheet contact the peaks of an adjacent sheet. The apparatus also comprises an air blower disposed beneath the top of the stack for reducing the air pressure surrounding the stack to a pressure below the air pressure on the top of the stack, thereby pressing the layers together to form the core. The present invention also relates to a transfer head and a process for holding a half-cell structure. The transfer head comprises a plurality of support bars for supporting the half-cell structure and at least one space formed between each support bar, where the width of each space is about the distance between adjacent valleys of the structure, and the depth of the space is greater than the height of the peaks.

8 Claims, 18 Drawing Sheets

U.S. PATENT DOCUMENTS

| | | | |
|---|---|---|---|
| 3,072,225 | 1/1963 | Cremer et al. | 156/197 |
| 3,123,031 | 3/1964 | Pickett | 271/217 |
| 3,301,729 | 1/1967 | Kauffman | 156/197 |
| 3,342,666 | 9/1967 | Hull | 161/135 |
| 3,366,525 | 1/1968 | Jackson | 156/197 |
| 3,466,957 | 9/1969 | Anderson et al. | 83/23 |
| 3,493,450 | 2/1970 | Judge . | |
| 3,600,249 | 8/1971 | Jackson et al. | 156/197 |
| 3,887,418 | 6/1975 | Jurisich | 156/197 |
| 4,033,579 | 7/1977 | Stange et al. | 271/217 |
| 4,042,233 | 8/1977 | Vits | 156/557 X |
| 4,174,945 | 11/1979 | Gertz | 425/501 |
| 4,290,837 | 9/1981 | Bova . | |
| 4,338,154 | 7/1982 | Berthelot et al. | 156/462 |
| 4,537,208 | 8/1985 | Kuhl | 271/207 |
| 4,685,318 | 8/1987 | Ueda et al. . | |
| 4,890,825 | 1/1990 | McCormick et al. | 271/217 |
| 4,931,131 | 6/1990 | Thompson | 156/558 X |
| 5,076,559 | 12/1991 | Lawniczak | 271/207 |
| 5,245,897 | 9/1993 | Arnold et al. | 83/56 |
| 5,250,144 | 10/1993 | Fitzpatrick-Ellis et al. | 156/556 |
| 5,275,657 | 1/1994 | Duffy et al. | 118/224 |
| 5,296,280 | 3/1994 | Lin et al. | 428/118 |

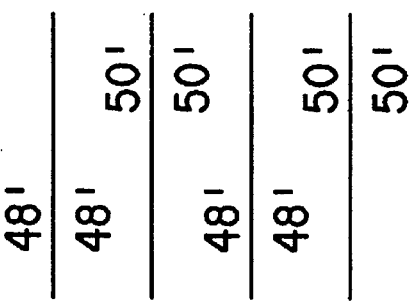
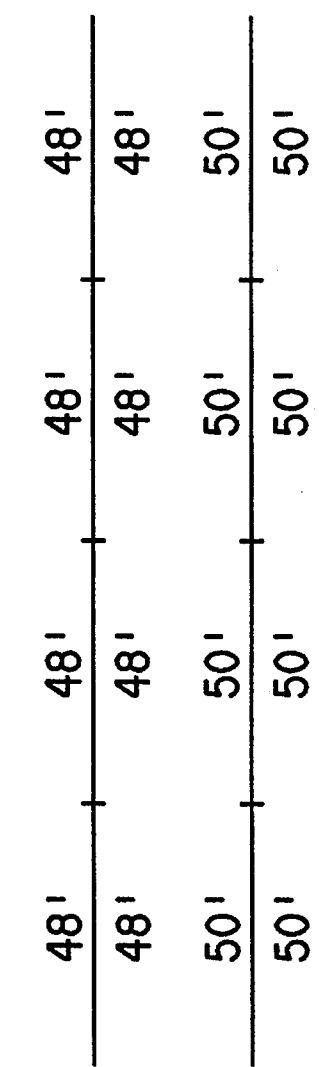
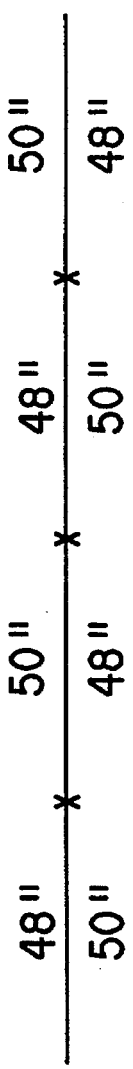

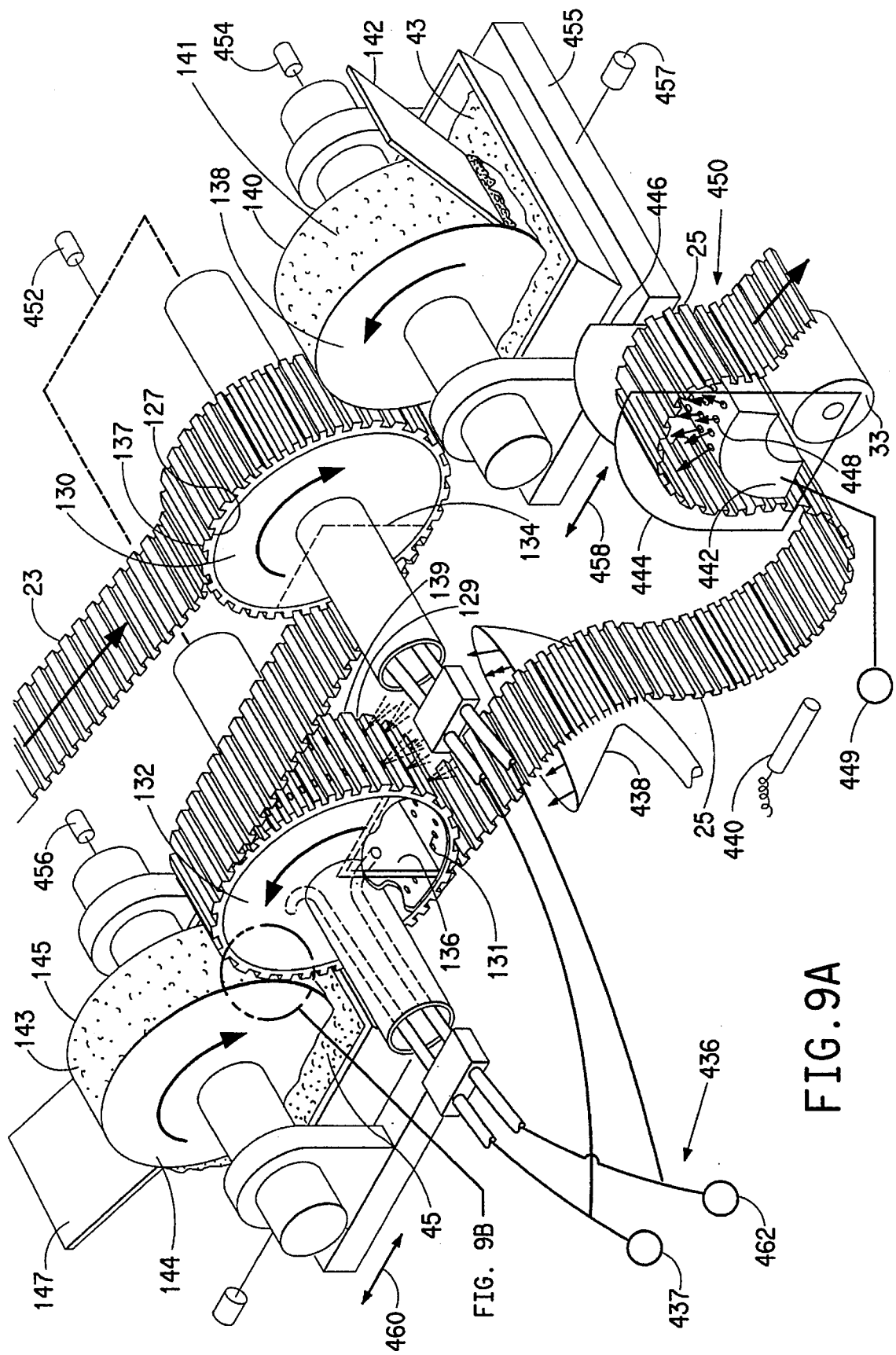

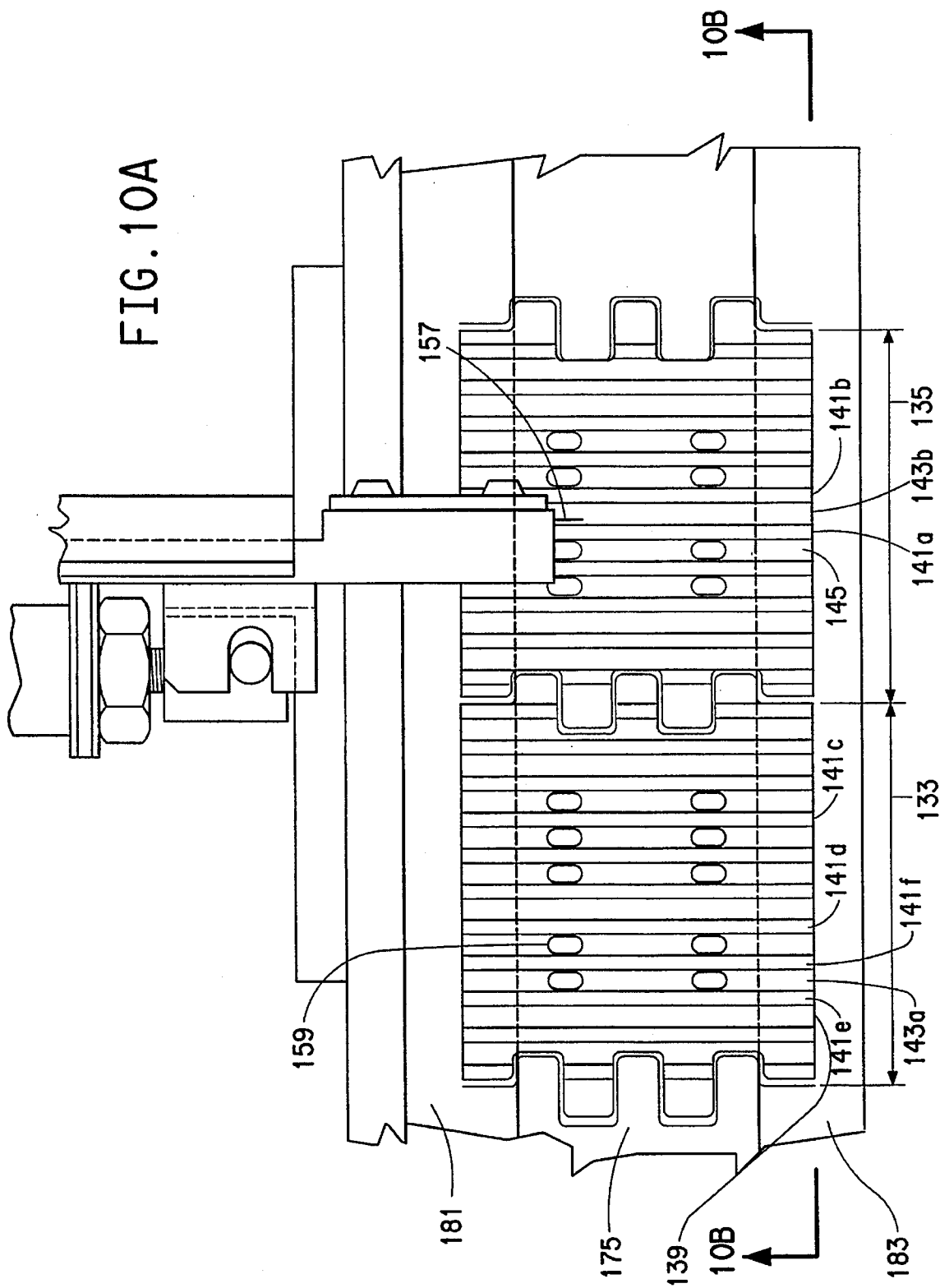

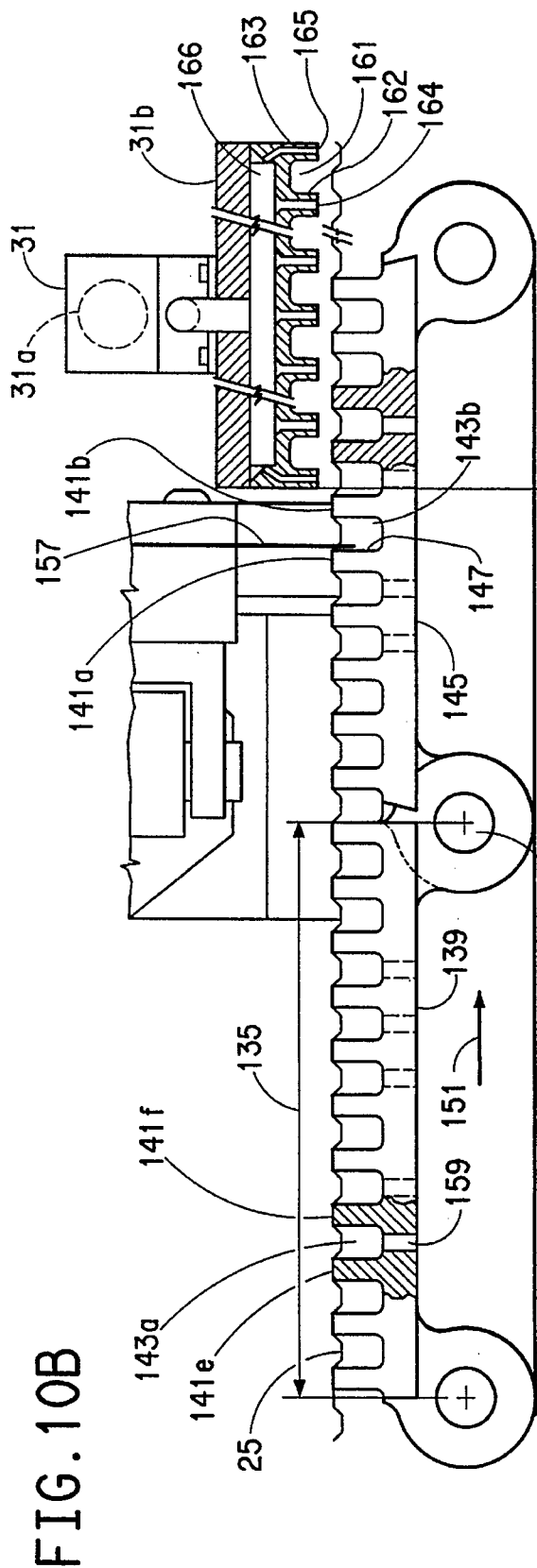
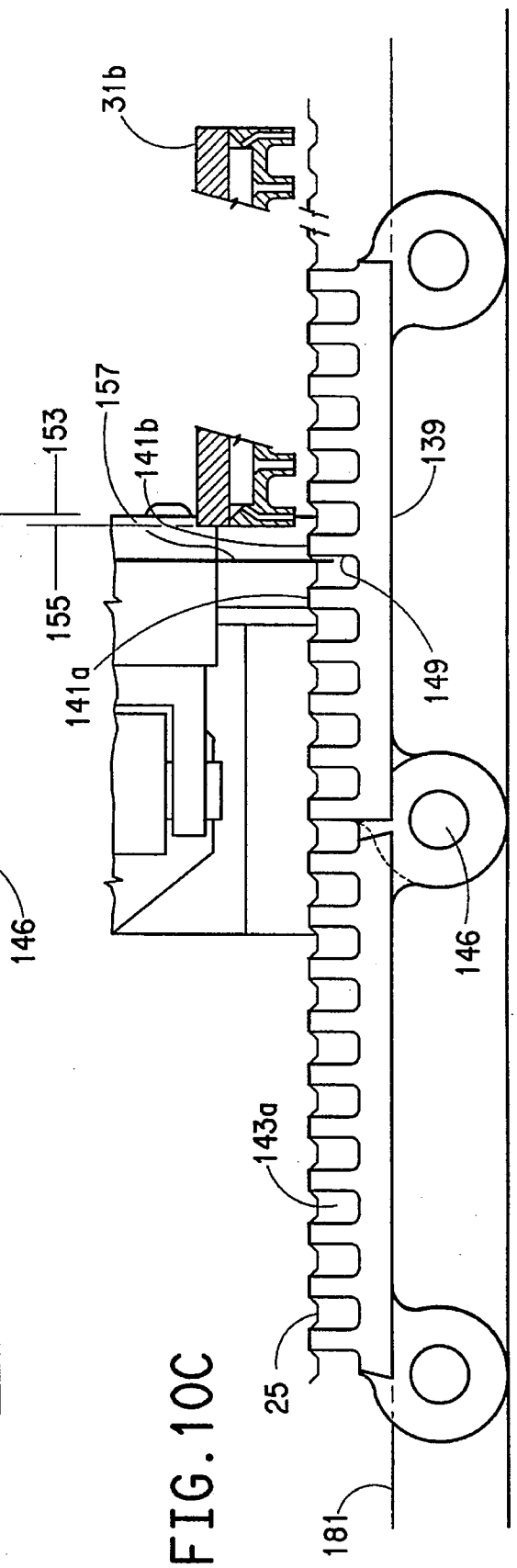
FIG. 10B
FIG. 10C

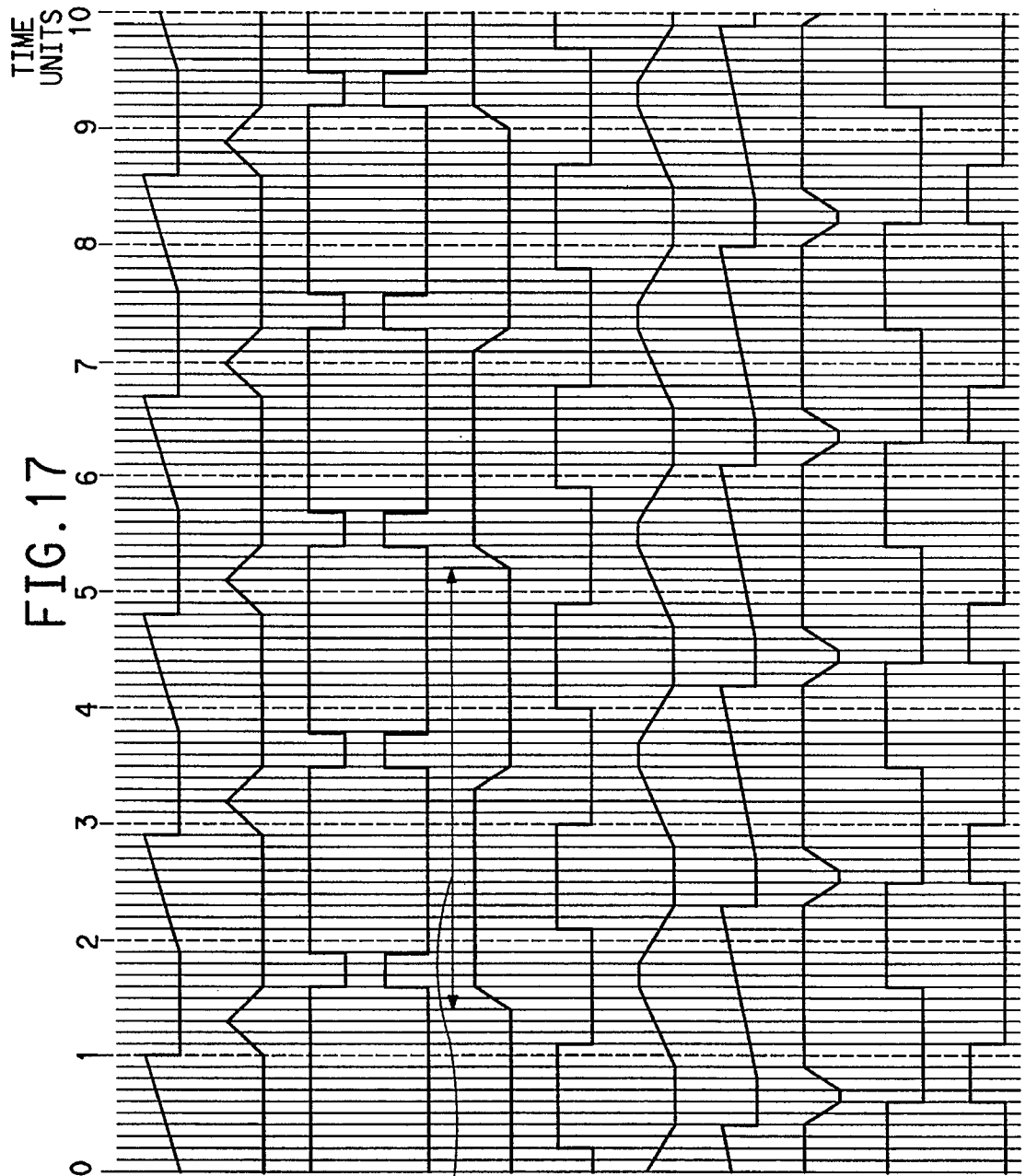

5,616,204

TRANSFER HEAD FOR HOLDING HALF-CELL STRUCTURE

This is a division of application Ser. No. 07/797,329, filed Nov. 25, 1991, now U.S. Pat. No. 5,340,429.

FIELD OF THE INVENTION

The present invention relates to an apparatus and a process for stacking a half-cell structure to make a hexagonal-cell honeycomb core and a transfer head and a process for holding the half-cell structure.

Description of the Related Art

Devices for stacking a corrugated medium are known. For example, U.S. Pat. No. 3,044,921 to Wentworth et al. discloses a system of stacking corrugated aluminum foil by providing mating projections along the foil and partial cuts across the foil at the top of a corrugation to create hinge lines. The projections of one layer register with the corrugations of an adjacent layer. The foil is coated on the tops and bottoms of the corrugations with adhesive and manually folded back and forth to form a core on a movable platform. Alternatively, adhesive is applied and dried on the tops and bottoms of the corrugations, and projections are punched in the tops and bottoms. The foil is then cut into uniform length sheets which are stacked by hand on a movable platform. In either case, the core, after stacking, is placed under heat and pressure to bond the layers or the sheets, respectively, at the adhesive-coated contact areas.

U.S. Pat. No. 2,518,164 to Meyer discloses a system for assembling sheets of half-cell structure to a core where a sheet coated with a thermoset adhesive is manually placed on a heated work holding plate. A sheet pick-up plate carries at its opposite longitudinal edges two rows of sheet pick-up pins. When the sheet pick-up plate holding previously assembled sheets is lowered onto the work holding plate, the pins are driven through the edge of the heated sheet. The work holding plate is heated to cure the adhesive on the sheet placed there. When the core is completed, it is removed from the pins. Alternatively, the core may be removed from the pins and placed in an oven to allow the adhesive to cure. In another embodiment, tubular binding elements penetrate successive sheets and aid in the preservation of the condition of the core in which it was assembled and in the removal of the core from the pins.

U.S. Pat. No. 3,887,418 to Jurisich discloses an apparatus and a process for forming a honeycomb core where two webs are corrugated to form crests and troughs. Adhesive is applied to the crests and troughs of one of the webs, and the other web is left uncoated. Layers of the web are then stacked so that the crests and troughs nest one inside of another and so as to alternate an adhesive coated corrugated web with an uncoated corrugated web. Heat and/or pressure is then applied to the stack to effect bonding of the stacked web. Heated continuous belts grip the sides of the bonded stacked to heat it for curing and pull it apart to expand the stack and form the open honeycomb structure.

The configurations for stacking in such known devices are complicated, time-consuming and thus expensive. Moreover, registration of the sheets with pins and projections produces waste product that often must be removed after assembly.

SUMMARY OF THE INVENTION

Accordingly, it is an object of the present invention to provide an apparatus and a process for stacking sheets of half-cell structure which accurately align the sheets without waste as they are stacked to form a honeycomb core.

It is also an object of the present invention to provide an apparatus and a process for stacking sheets that are simple and thus economical.

A further object of the present invention is to provide an apparatus and a process for stacking sheets which produce a honeycomb core which is accurate and inexpensive to manufacture.

Another object of the present invention is to provide a transfer head and a process for holding a half-cell structure.

In order to achieve the foregoing objects, there is provided an apparatus for stacking a half-cell structure to make a hexagonal-cell honeycomb core. The structure has a plurality of peaks, a plurality of valleys and a diagonal surface between each consecutive peak and valley. The apparatus comprises a stacking mechanism for stacking the layers so that as one layer is placed on the top of a stack comprising at least one layer, the peaks of one layer contact the peaks of an adjacent layer. The apparatus also comprises a differential pressure mechanism disposed beneath the top of the stack for reducing the air pressure surrounding the stack to a pressure below the air pressure on the top of the stack, thereby pressing the sheets together to form the core.

Further in accordance with the present invention, there is provided a transfer head for holding at least one sheet of half-cell structure. The transfer head comprises a plurality of support bars for supporting the sheet and at least one space formed between each support bar. The width of each space is about the distance between adjacent valleys of the half-cell structure, and the depth of the space is greater than the height of the peaks.

BRIEF DESCRIPTION OF THE DRAWINGS

The accompanying drawings, which are incorporated in and a part of this specification, illustrate various embodiments of the and together with the description, serve to explain the principles invention.

FIG. 7A is a side view illustrating the application of first and second adhesive components to the peaks of a half-cell structure according to an alternative embodiment of the present invention.

FIG. 7B is a side view illustrating stacking the half-cell structure according to the alternative embodiment of the present invention shown in FIG. 7A.

FIG. 8A is a side view illustrating the application of first and second adhesive components to the peaks of a half-cell structure according to another alternative embodiment of the present invention.

FIG. 8B is a side view illustrating folding the half-cell structure according to the other alternative embodiment of the present invention shown in FIG. 8A.

FIG. 9A is an enlarged perspective view of an adhesive applying apparatus of the present invention as shown in FIG. 1.

FIG. 10A is an enlarged plan view of a portion of a cutting apparatus of the present invention as shown in FIG. 1.

FIG. 10B is a cross-sectional view of the cutting apparatus taken across lines 10B—10B of FIG. 10A showing a plurality of conveyor platens and a stacker arm in position for picking up a sheet of half-cell structure.

FIG. 10C is a shifted view of the cross-sectional view of FIG. 10B and showing different platens in position for cutting the half-cell structure than those shown in FIG. 10B.

FIG. 14A is a cross-sectional view of a stacking apparatus of the present invention taken across lines 14A—14A of FIG. 1.

FIG. 17 is a timing diagram which illustrates the control system logic for operating the system for producing a honeycomb core from the half-cell structure.

DESCRIPTION OF THE PREFERRED EMBODIMENTS

Reference will now be made in detail to the present preferred embodiments of the invention, examples of which are illustrated in the accompanying drawings. Whenever possible, the same reference numbers will be used throughout the drawings to refer to the same parts.

Figure 1:
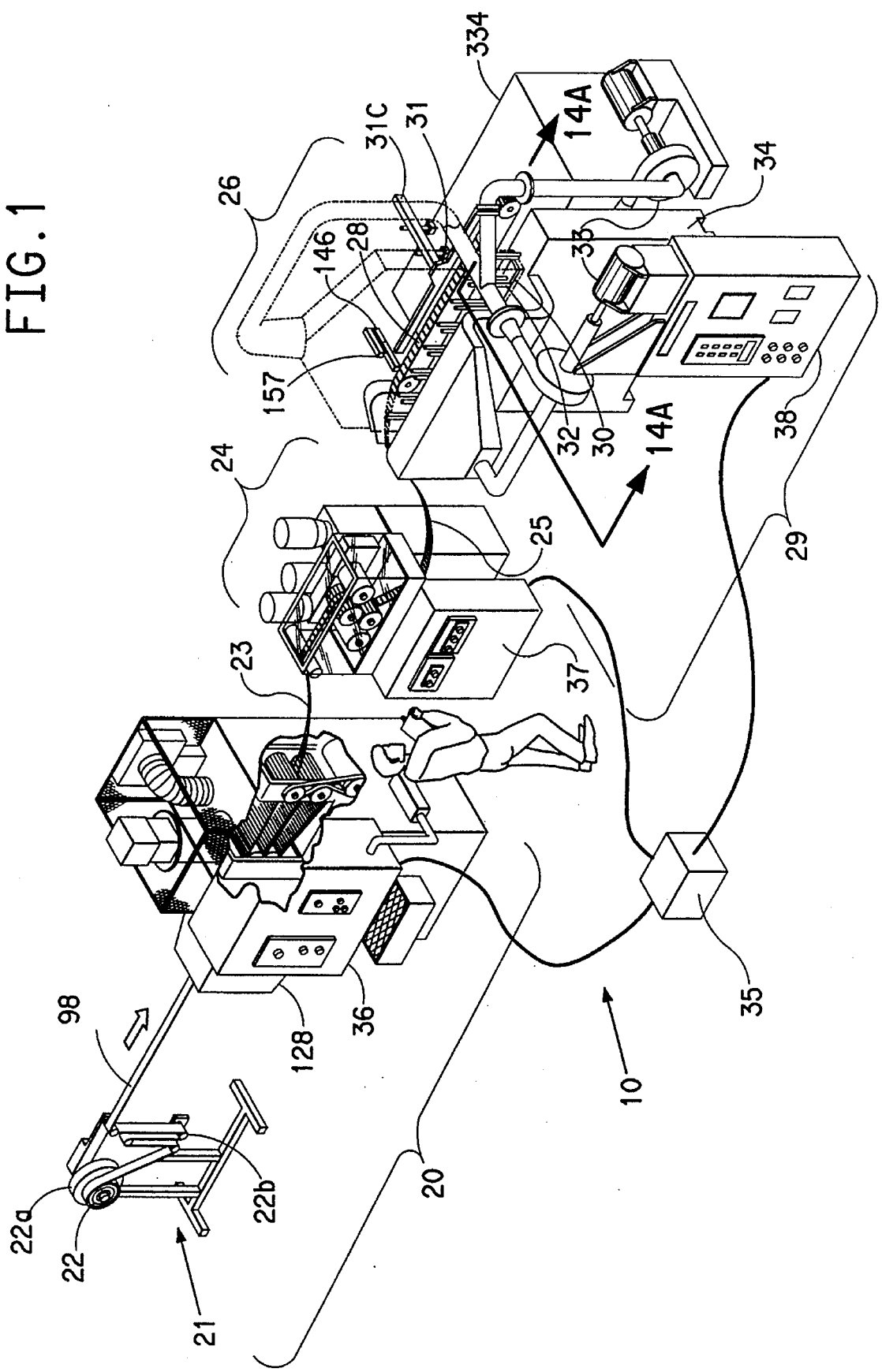
FIG. 1 is an overall, perspective view of a system for forming a honeycomb half-cell structure from a supply of material and for producing a honeycomb core from the half-cell structure according to the present invention.

FIG. 1 is an overall perspective view of a system, shown generally at 10, for forming a honeycomb half-cell structure from a supply of material and for producing a hexagonal-cell honeycomb core from the half-cell structure. The individual apparatus of system 10 may be operated in a stand-alone, batch process or in an integrated, over-all process.

In accordance with the present invention, there is provided a half-cell forming apparatus for making a honeycomb half-cell structure from a continuous web of material. A half-cell forming apparatus is shown at 20 in FIG. 1 which forms a continuous supply of honeycomb half-cell structure from the material. Apparatus 20 is part of over-all system 10 and will be described in greater detail below. As shown in FIG. 1, apparatus 20 comprises a continuous web unwind stand, shown generally at 21 in FIG. 1, for storing a supply of the material. Web unwind stand 21 includes a spool 22, a disc 22a, a tensioning roll assembly 22b, and a conventional brake mechanism (not shown). The brake mechanism engages disc 22a to resist unwinding of spool 22 by tensioning roll assembly 22b. Thus, the brake mechanism, disc 22a and roll assembly 22b maintain tension on the unwinding web as it is drawn through half-cell forming apparatus 20. A formed half-cell structure is shown at 23 in FIG. 1 exiting half-cell forming apparatus 20.

In accordance with the present invention, there is provided an apparatus for applying at least one adhesive component to the honeycomb half-cell structure. The apparatus for applying the adhesive component is shown at 24 in FIG. 1. Apparatus 24 is part of over-all system 10, and will be described in greater detail below. An adhesive-coated half-cell structure is shown exiting the adhesive applying apparatus at 25 in FIG. 1.

In accordance with the present invention, there is provided an apparatus for cutting the continuous supply of honeycomb half-cell structure into a plurality of sheets. The cutting apparatus of the present invention is shown generally at 26 in FIG. 1. Cutting apparatus 26 is a part of overall system 10, and will be described in greater detail below.

In accordance with the present invention, there is provided an apparatus for stacking a plurality of sheets of half-cell structure to make a hexagonal-cell honeycomb core. The apparatus is shown at 29 in FIG. 1. Apparatus 29 is part of over-all system 10, and will also be described below in greater detail. Apparatus 29 includes a stacker arm 31 for transferring the sheets to the top of a stack of sheets of half-cell structure and a stack holder 32 for supporting the stack of sheets. Stacking apparatus 29 also includes an air handling system 33 for providing conditioned air for heating the stack of sheets in the stack holder to cure an adhesive system applied thereto and a heated enclosure 34. The sheets are pressed together while they are heated, thereby forming a hexagonal-cell honeycomb core 30. Core 30 is shown sitting in stack holder 32 in FIG. 1.

Figure 2:
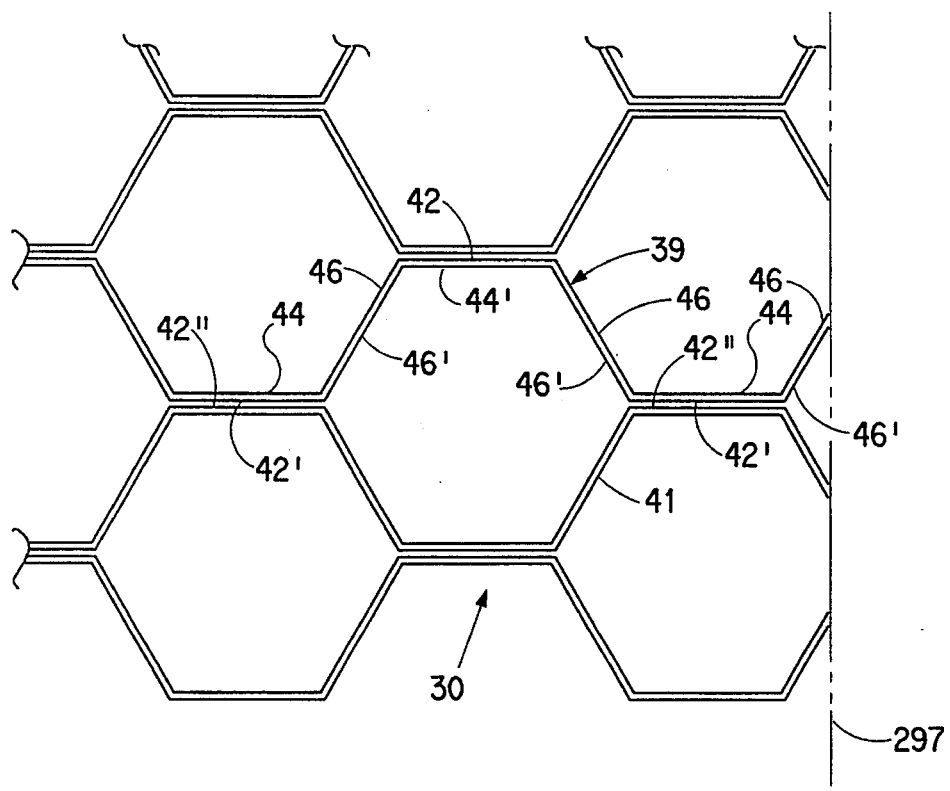
FIG. 2 is an exploded view of a corner section of the assembled honeycomb core of the present invention.

FIG. 2 is an exploded view of a corner section of the assembled honeycomb core, where the assembled sheets are shown spaced apart slightly for the purpose of defining the half-cell structure surfaces and how they come together to make up the core. As shown in FIG. 2, each sheet of half-cell structure in the assembled core, such as sheet 39, comprises a plurality of convex surfaces, or peaks, 42 on one side of the sheet and a plurality of concave surfaces, or valleys, 44 on the same one side of the sheet. The other side of sheet 39 also comprises a plurality of convex surfaces, or peaks, 42' on the other side of the sheet and a plurality of concave surfaces, or valleys, 44' on the same other side of the sheet. For reference purposes in FIG. 2, the one side of the sheet of half-cell structure is facing up and the other side of the same sheet is facing down. Peaks 42 on the one side are opposite valleys 44' on the other side, and valleys 44 on the one side are opposite peaks 42' on the other side. A diagonal surface 46 is formed between each consecutive peak and valley on the one side of the sheet, and a diagonal surface 46' is formed between each consecutive peak and valley on the other side of the sheet. When a first sheet 39 of half-cell structure is stacked on top of a second sheet 41 of half-cell structure to form a core 30, peaks 42' on the other side of the first sheet contact peaks 42" on the one top side of the second sheet.

Referring again to FIG. 1, system 10 also includes a central control system 35 and distributed control centers 36, 37 and 38 which coordinate the handling of the web of material or half-cell structure and temperature monitoring and motion control in half-cell forming apparatus 20, in adhesive applying apparatus 24 and in stacking apparatus 29, respectively. Various safety interlocks and emergency shut-down procedures are monitored and implemented by central control system 35 and by a plurality of distributed control systems 36, 37 and 38. Distributed control system 36 controls the speed and various methods of heating the half-cell forming apparatus. It also provides process temperature tension and speed monitoring for this apparatus. Distributed control system 37 controls roll speed and resin temperature in adhesive applying apparatus 24. Distributed control system 38 controls the operation of cutting apparatus 26, including the motion of conveyor 28, and the operation of stacking apparatus 29, including the motion of stacker arm 31 and stack holder 32. It also controls the temperature in the stack holder.

Figure 3:
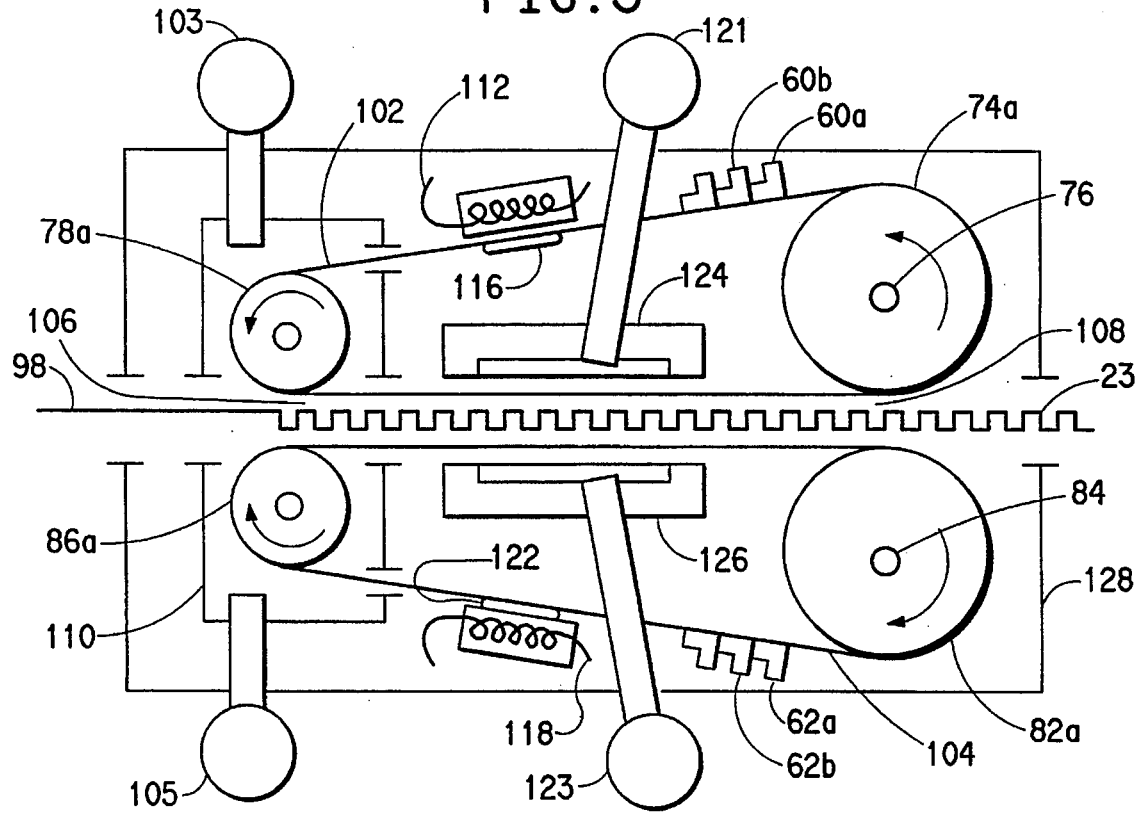
FIG. 3 is a schematic view of a portion of a half-cell forming apparatus of the present invention.

FIG. 3 is a schematic view of a portion of half-cell forming apparatus 20 during the thermal cycle of the apparatus when the material of the web is deformed and set. The half-cell forming apparatus of the present invention comprises means for positioning a length of the web while maintaining the tension thereof. The positioning means includes an upper loop 102 and a lower loop 104 as shown in FIG. 3. Upper loop 102 comprises a plurality of upper bars 60a and 60b attached to a pair of chains, and lower loop 104 comprises a plurality of lower bars 62a and 62b, attached to another pair of chains. The bars of each loop include at least one surface for contacting the web. Upper loop 102 and lower loop 104 are disposed in a housing 128. A web 98 enters housing 128 at the left in FIGS. 1 and 3 and is carried between the bars of the upper and lower loops as they travel in parallel alignment between an entry nip 106 and an exit nip 108. The web exits as formed half-cell structure 23.

Figure 4:
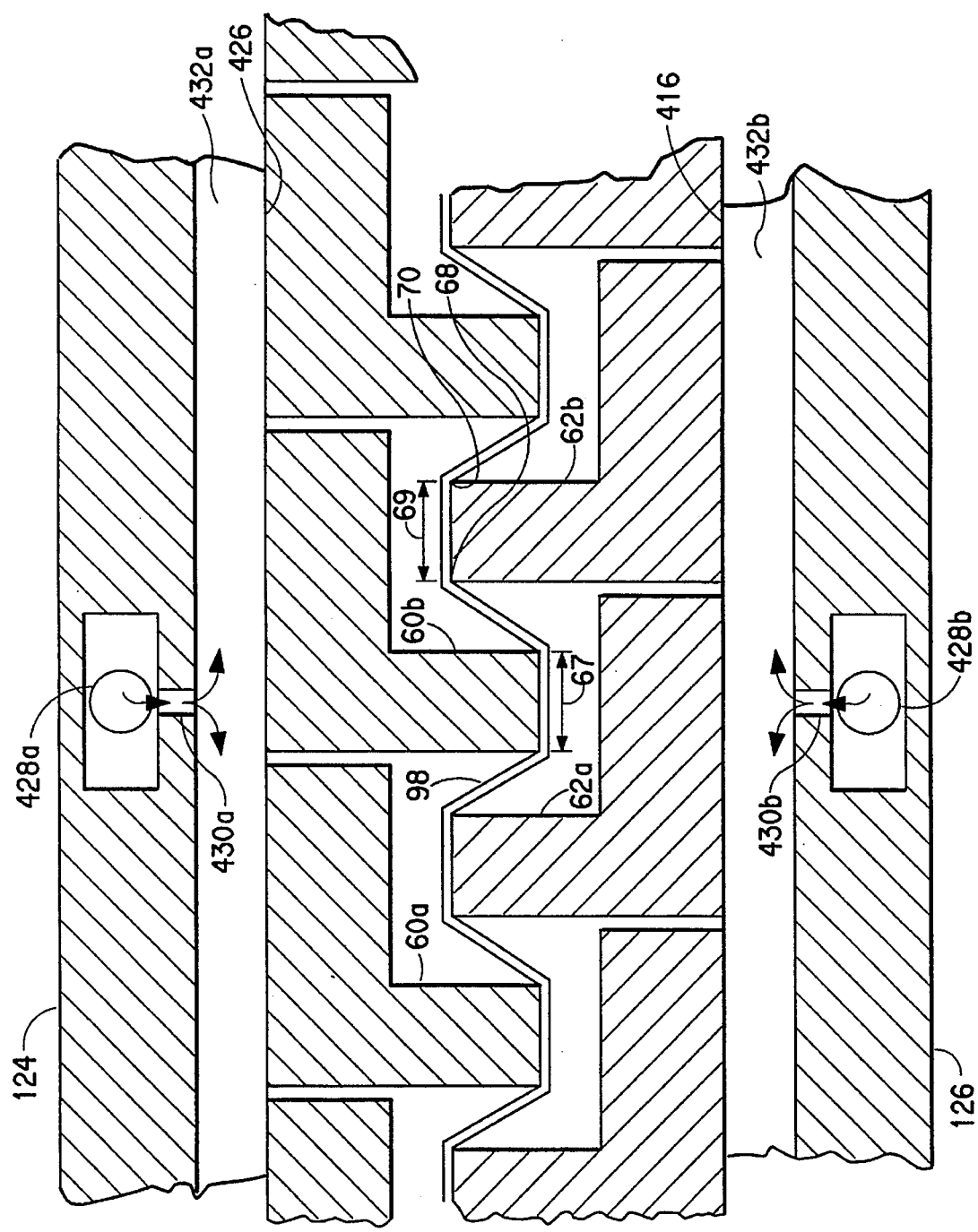
FIG. 4 is an enlarged, schematic view of the bars and the back-up plates of the half-cell forming apparatus of the present invention.

The half-cell structure in forming apparatus 20 is shown more particularly in FIG. 4. The web of material is placed between meshed bars 60a, 62a and bends back and forth over the corners, such as those shown at 68 and 70 in FIG. 4, of the bars. The width of the upper and lower bars, as illustrated by reference numerals 67 and 69, respectively, determines the width of the peaks and valleys of the half-cell structure. The creased form of the half-cell structure is locked in when it exits the half-cell forming apparatus at exit nip 108 as shown in FIG. 3, so that the pitch of the half-cell structure is similar to the pitch of the half-cell forming apparatus. The bars of the half-cell forming apparatus of the present invention are not to be degraded by the high temperatures achieved during the operation of the apparatus. Also, the bars have a surface finish that does not stick to the web. A bar material that has been found to work well with a variety of webs is a nickel-coated carbon steel.

Figure 5A:
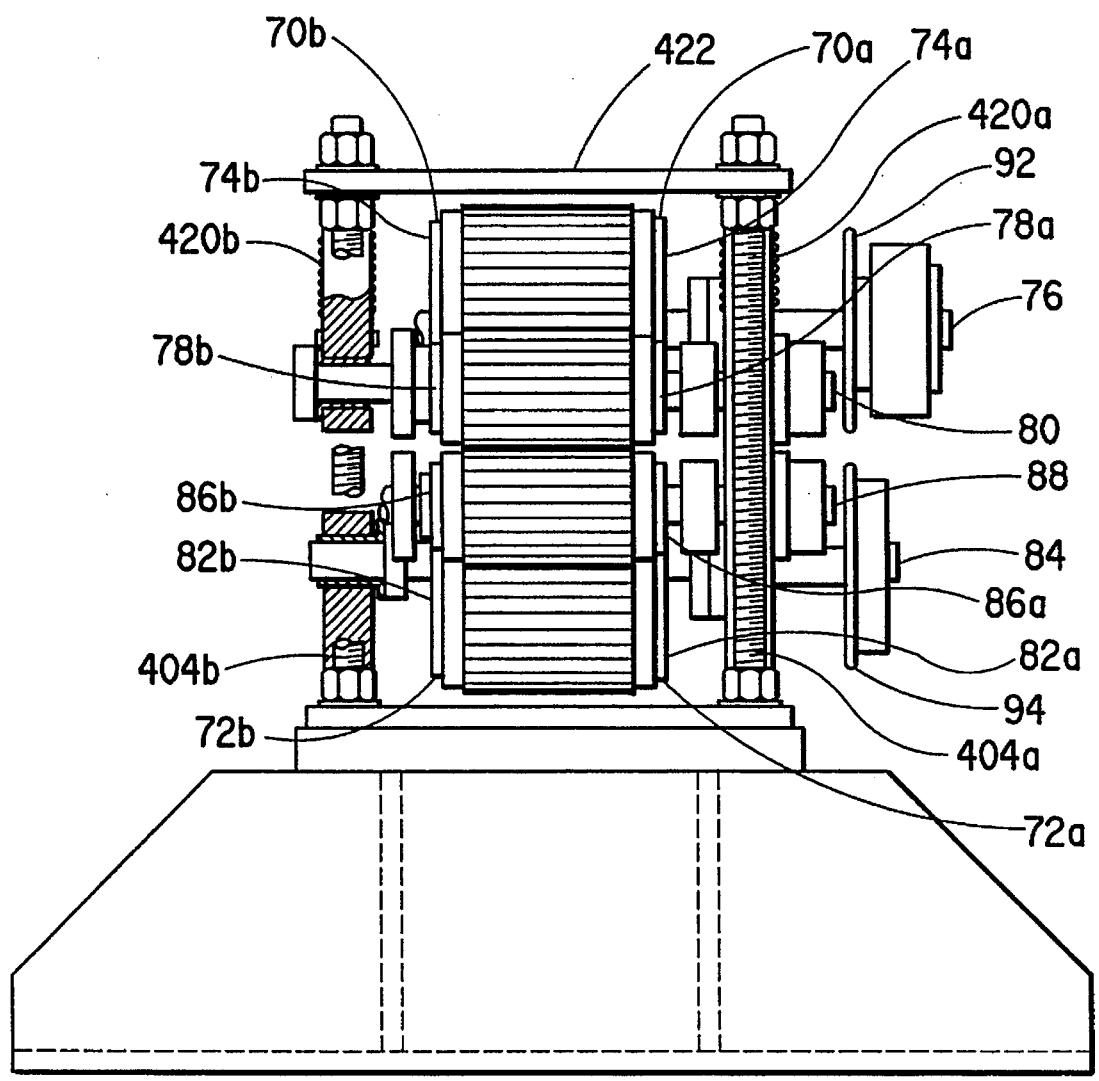
FIG. 5A is an end view of a portion of a half-cell forming apparatus taken across lines 5A—5A of FIG. 5B.
Figure 5B:
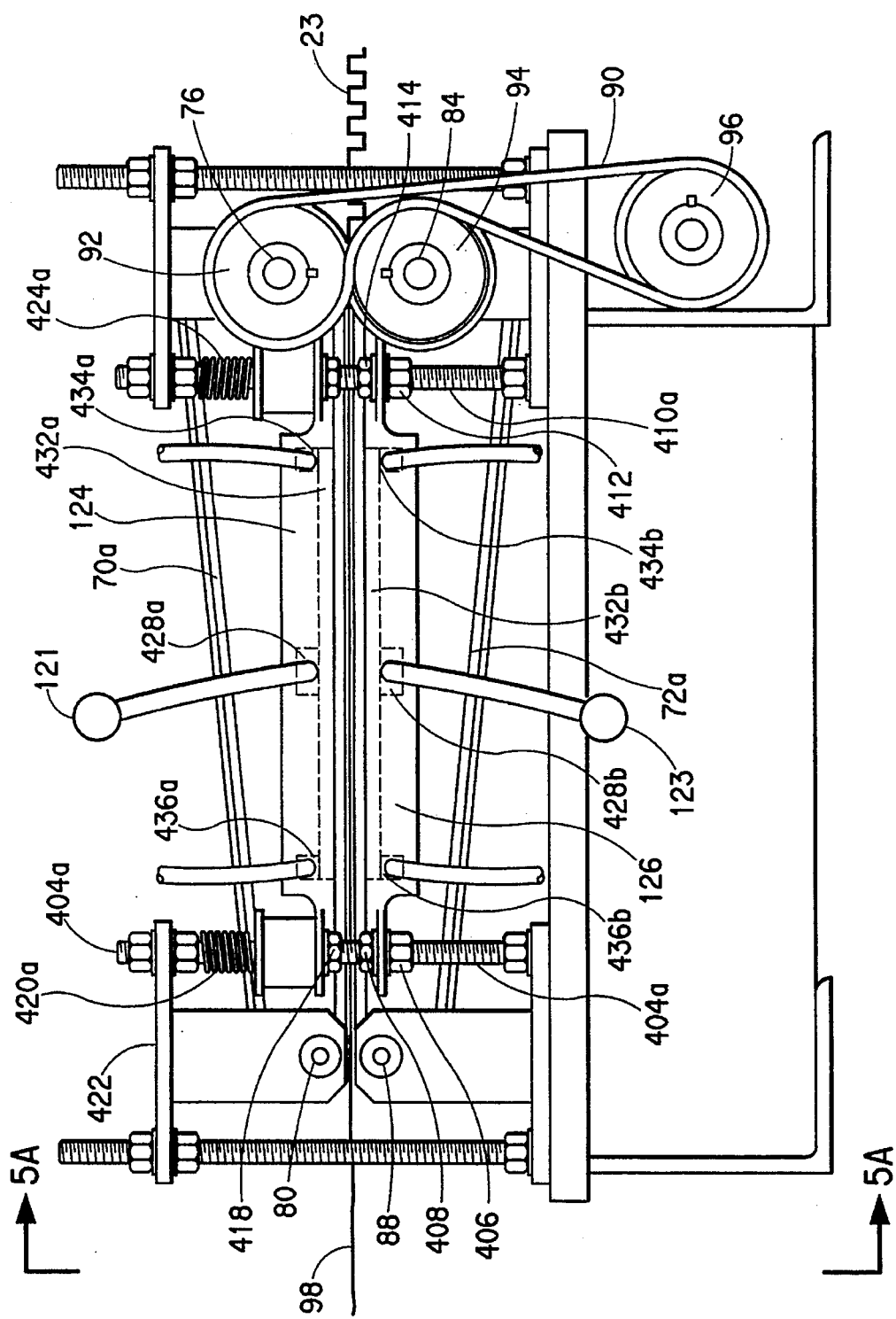
FIG. 5B is a side view of the half-cell forming apparatus as shown in FIG. 1.

As shown in FIGS. 5A and 5B, the bars are connected to each other and supported on each end by a pair of upper roller chains 70a and 70b and a pair of lower roller chains 72a and 72b. Upper roller chains 70a and 70b are supported by a plurality of driven sprockets 74a and 74b disposed on a shaft 76 and a plurality of upper idler sprockets 78a and 78b disposed on an upper entrance shaft 80. Lower roller chains 72a and 72b are supported by a plurality of driven sprockets 82a and 82b disposed on a shaft 84 and by a plurality of lower idler sprockets 86a, 86b disposed on a lower entrance shaft 88. Driven sprockets 74a and 82a and idler sprockets 78a and 86a are also shown in FIG. 3. Upper idler sprockets 78a, 78b and lower idler sprockets 86a, 86b are all surrounded by an enclosure 110, although in FIG. 3 only idler sprockets 78a and 86a are shown surrounded by the enclosure. Shafts 76 and 84 are driven by engagement with a driving chain 90 as shown in FIG. 5B that is entrained over an upper sprocket 92, a lower sprocket 94 and a motor-driven sprocket 96. Upper and lower sprockets 92 and 94, respectively, upper chains 70a and 70b and lower chains 72a and 72b, and upper bars 60a, 60b and lower bars 62a, 62b must be carefully aligned by measuring the bar locations around shafts 76 and 84 for accurate positioning of the bars to make accurately formed half-cell structure. Upper idler sprockets 78a, 78b and lower idler sprockets 86a, 86b are made as small as practical to bring the attached bars into mesh over a small, sharp radius so the web is engaged between cooperating bars before it contacts and is restrained by succeeding bars.

The half-cell forming apparatus of the present invention comprises means for pre-heating the positioning means to at least the deformation temperature of the web before the positioning means is placed in contact with the web. Preferably, the pre-heating means comprises an induction coil 112 disposed adjacent the web-contacting surface of the bars of upper loop 102 for heating upper bars 60a, 60b to a temperature above the web deformation temperature just before they enter enclosure 110. The pre-heating means also preferably includes an induction coil 118 disposed adjacent the web-contacting surface of the bars of lower loop 104 for heating lower bars 62a, 62b. Upper roller chains 70a, 70b, which support bars 60a, 60b and lower roller chains 72a, 72b, which support bars 62a, 62b, remain outside coils 112, 118, respectively, and are not heated by the coils. Preferably, induction coils 112, 118 heat the entire web-contacting surface of the bars of each loop. The pre-heating means may also comprise any heating source, including, but not limited to, a radiant heater, a convection heater, or an electrical resistance heater. Upper bars 60a, 60b are supported relative to coil 112 by a slide 116, and lower bars 62a, 62b are supported relative to coil 118 by a slide 122. The pre-heating means also includes a plurality of forced air blowers 103, 105 as shown in FIG. 3 disposed on the outer surface of each loop, which maintain the web deformation temperature on the bars established by induction coils 112 and 118.

The half-cell forming apparatus of the present invention also comprises means for maintaining the tension on the positioning means and for cooling the positioning means to the stabilization temperature of the web while holding the web thereon. The tension maintaining and cooling means comprises an upper back-up plate 124 and a lower back-up plate 126 as shown in FIGS. 3 and 5B disposed on the respective inner surfaces of the bars of upper and lower loops 102, 104, respectively. In addition, a plurality of blowers 121 and 123 as shown in FIG. 3 is provided which circulate cooling air through the back-up plates and around bars 60a, 60b and 62a, 62b and web 98. As shown in FIGS. 3 and 4, web 98 extends between upper back-up plate 124 and lower back-up plate 126. It is important to ensure that the web is held tightly against the corners of the bars during cooling, thereby maintaining tension in the web, so that sharp, accurate bends will be made in the web to form the half-cell structure. Back-up plates 124, 126, in addition to cooling the bars, maintain the tension on the web.

As shown in FIGS. 5A and 5B, upper back-up plate 124 is pivotably held at the upstream end on a plurality of threaded rods 404a, 404b by a nut 418 on each rod and by a plurality of springs 420a, 420b held under a plate 422. Springs 420a and 420b do not permit vertical translation of back-up plate 124 along rods 404a and 404b, respectively, but they do permit rocking and thereby acts as a pivot for one end of upper back-up plate 124. The other end of upper back-up plate 124 is pressed toward lower back-up plate 126 by a plurality of springs 424a, only one of which is shown in FIG. 5B. The back surface of upper bars 60a and 60b slides on a surface 426 as shown in FIG. 4 at the two lateral edges of upper back-up plate 124. Also, as shown in FIG. 5B, lower back-up plate 126 is fixedly supported at one end on threaded rods 404a and 404b (FIG. 5A) by a plurality of nuts 406, 408 engaging the end of back-up plate 126 and at the other end by a plurality of threaded rods, such as 410a, and by a plurality of nuts 412 and 414. The back surface of lower bars 62a and 62b slides on a surface 416 as shown in FIG. 4 at the two lateral edges of lower back-up plate 126.

The back-up plates comprise a plurality of channels for providing cooling fluid to the back surfaces thereof. A description of the channels will be made with reference to FIGS. 4 and 5B. The channels include a fluid port 428a and 428b, an adjustable slot 430a and 430b and a groove 432a and 432b, formed in upper back-up plate 124 and lower back-up plate 126, respectively. The channels also include a plurality of exit ports 434a and 436a as shown in FIG. 5B formed in upper back-up plate 124 and exit ports 434b and 436b formed in lower back-up plate 126. Fluid ports 428a and 428b are in fluid communication with groove 432a and 432b, respectively, via adjustable slot 430a and 430b, respectively. Exit ports 434a and 434b and 436a and 436b are disposed in fluid communication with the ends of grooves 432a and 432b, respectively. Cooling fluid flows through port 428a, into groove 432a via slot 430a and out through exit ports 434a and 436a to cool the back surfaces of upper bars 60a, 60b as shown in FIG. 4 which contact upper back-up plate 124. Similarly, cooling fluid flow through port 428b, into groove 432b via slot 430b and out through exit ports 434b and 436b to cool the back surfaces of lower bars 62a, 62b which contact lower back-up plate 126.

When pre-heating the web, it has been found that it is not sufficient to only heat the material of the web and bring it into contact with a lower temperature surface, such as that of the bars, to lock in the creases. The thermal inertial of a thin web is very low, so a heated web would be quenched too rapidly by a cooler surface before a sharp crease would form. If the web does not reach the deformation temperature upon contact with the bars, the bending stress applied may be insufficient to sharply crease the web. Later heating to the deformation temperature would then produce slack portions of web on the bars, and an inaccurate half-cell structure would result. In order to prevent this, it is necessary to heat the bars to at least the deformation temperature of the web before the web is placed in contact with the bars. It is also necessary for the material of the web to immediately conform to sharp corners, such as those shown at 68 and 70 in FIG. 4, of the half-cell forming apparatus bars upon contact and be held in the creased form at the web deformation temperature for a brief moment before lowering the temperature to the stabilization temperature of the web. Therefore, the bars of the half-cell forming apparatus of the present invention must be cycled in temperature to the web stabilization temperature while the web is held thereon to set the creases and then back to the web deformation temperature so that it is ready for the next section of web. In addition, the web may be pre-heated to essentially the web deformation temperature when contacting the bars at entry nip 106. For very thin webs with low thermal inertia, pre-heating the web may not be necessary, as the web will rapidly reach the deformation temperature just by contacting the bars. Heavier webs may require pre-heating.

The bars and the web are held at the deformation temperature for the time they remain in enclosure 110. The bars and the web are lowered in temperature to the stabilization temperature of the material of the web after leaving enclosure 110. Housing 128 is kept at a temperature generally near the web stabilization temperature. The web should not be released from the bars until it has reached the stabilization temperature, or the bent form of the half-cell structure will not be accurately retained. For an aramid paper, such as a paper made from poly(m-phenylene isophthalamide), the deformation temperature is a temperature near or above the glass transition temperature and below a temperature that will thermally degrade or significantly discolor the paper. The stabilization temperature is a temperature significantly below the deformation temperature, so that deformation of the half-cell structure will no longer occur, but not so far below that reheating the bars is difficult. The stabilization temperature "locks in", or sets the form of the bars in the web.

In addition, it is important that the web is placed on bars 60a, 60b, 62a, 62b while under tension, and that tension is maintained on the web while it is held on the bars. The entrance tension on web 98 in FIG. 3 as it enters the half-cell forming apparatus will not be transmitted through the web after it has passed over several bars, 60a, 60b, 62a and 62b, as shown in FIG. 4, because of friction. For some webs, web tension develops as the web contracts during cooling, but for other webs, the thermal expansion coefficient is low, so no appreciable contraction occurs during cooling. For such webs, special methods of tensioning are achieved by back-up plates 124 and 126 as described above. The back-up plates ensure sharp corners, such as those shown at 68 and 70 in FIG. 4, are maintained in the half-cell structure, in spite of tolerance variations in chains 70a, 70b, 72a, 72b, in bars 60a, 60b, 62a, 62b and in upper back-up plate 124 and lower back-up plate 126.

Half-cell structure forming apparatus 20 is set to run at a speed to allow sufficient time for heating the bars of the apparatus and the web to the deformation temperature of the web and for cooling the bars and the web to the stabilization temperature of the web. The web enters half-cell structure forming apparatus 20 at entry nip 106 as shown in FIG. 3 as a flat web of material under tension and exits as a supply of half-cell structure under no tension, except that imposed by the free weight of the exiting half-cell structure. The half-cell structure hangs under its own weight as shown in FIG. 1 when it comes out of the half-cell forming apparatus.

In accordance with the present invention, there is provided a process of making a honeycomb half-cell structure from a web of material. The process comprises the steps of pre-heating a plurality of bars, such as bars 60a, 60b, 62a and 62b to at least the deformation temperature of the web and contacting the outer surfaces of the bars with the web. The web and the bars are then cooled to the stabilization temperature of the web while holding the web on the bars. The web is then removed from the bars. The pre-heating step includes heating the web-contacting surfaces of the bars. In addition, the pre-heating step includes induction heating the bars. Preferably, the entire web-contacting surfaces of the bars are induction heated. Additionally, the web may be pre-heated before it is placed on the bars. The web is maintained under tension while it is placed on the bars, as well as while it is held on the bars.

Figure 6:
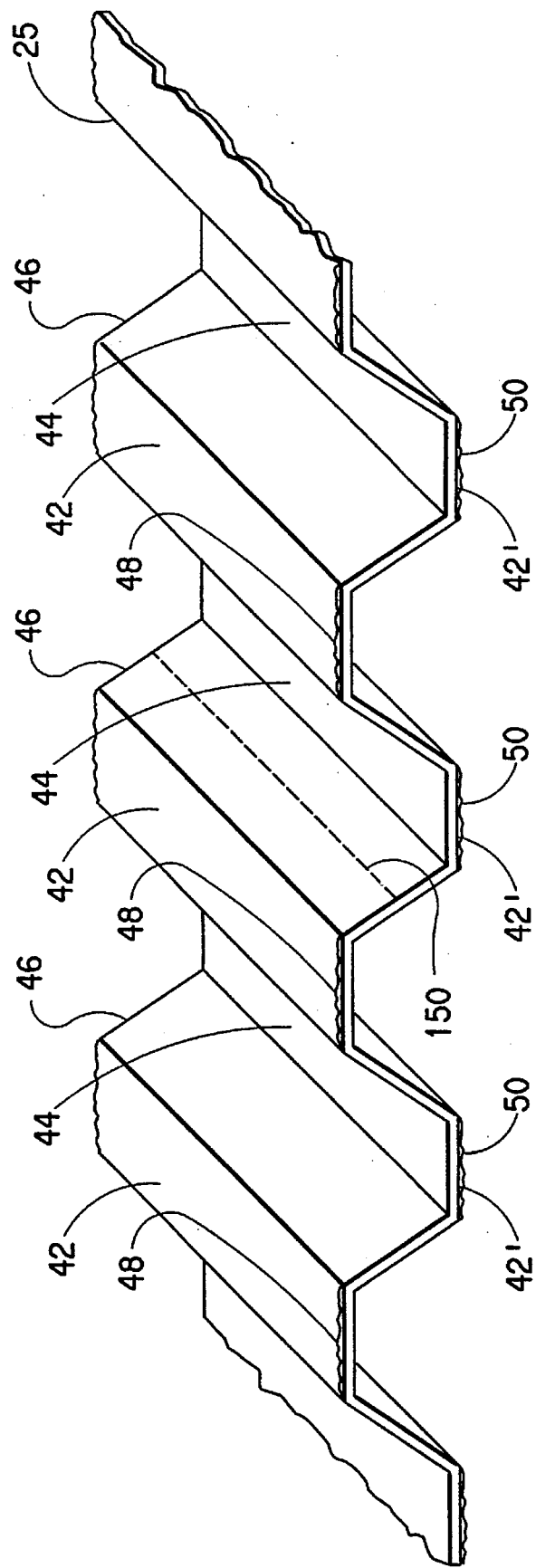
FIG. 6 is an enlarged perspective view of an adhesive-coated half-cell structure.

In accordance with the present invention, there is provided a process for making a hexagonal-cell honeycomb core from a honeycomb half-cell structure. The process comprises the steps of applying a first adhesive component to a first group of peaks, applying a second adhesive component to a second group of peaks and stacking the half-cell structure so that the first adhesive component on the first group of peaks comes into contact with the second adhesive component on the second group of peaks, thereby mixing the components to bond the half-cell structure together and form the honeycomb core. This process is illustrated with reference to FIG. 6. FIG. 6 is an enlarged, perspective view of a portion of half-cell structure 25 which has been coated with at least one adhesive. As noted above with respect to the description of FIG. 2, the peaks on one side of the half-cell structure are opposite valleys on the other side of the structure, and the valleys on the one side of the structure are opposite peaks on the other side of the structure. The step of applying the first adhesive component comprises applying the first adhesive component to the peaks on the one side of the structure, such as those shown at 42 in FIG. 6. The step of applying the second adhesive component comprises applying the second adhesive component to the peaks on the other side of the structure, such as those shown at 42' in FIG. 6. In the present invention, the two adhesive components are post-mixed after the half-cell structure is stacked, thereby allowing the two adhesive components of the adhesive system of the present invention to come into contact and cure to produce a strong bond. The adhesive components remain sticky during the application thereof and during stacking to preserve the alignment of the sheets while the adhesive components cure.

The step of applying the first adhesive component comprises applying a cyanate ester and an epoxy to the first group of peaks. A preferred first adhesive component is a combination of a cyanate ester such as Arocy B-30, commercially available from Hi-Tek Polymers, a subsidiary of Rhone Poulenc, of Louisville, Ky., and an epoxy, such as Epoxy Epon 826, commercially available from Shell Chemical Company of Houston, Tex. Any of the following is also suitable for the first adhesive component: epoxies, polyesters, polyimides, phenolics, polyureas, polyurethanes and bismaleimides. Any of the corresponding curing agents or catalysts for the above list are suitable for the second adhesive component. A purpose of the epoxy in the first adhesive component is to reduce the viscosity of the cyanate ester. It also accelerates the cure of the adhesive system when heat is applied. The first component can cure by itself over a long time (several hours or days) or quickly (several seconds) when a catalyst is used and heat is applied. The step of applying the second adhesive component comprises applying an epoxy and a catalyst to the second group of peaks. A preferred second adhesive component is a combination of the epoxy of the first adhesive component and a catalyst, such as zinc octoate soap. A purpose of the epoxy in the second adhesive component is to increase the viscosity of the catalyst. Preferably, the epoxy is the same epoxy as that used in the first adhesive component; however, the epoxy may be a different epoxy.

In accordance with the present invention, there is provided a hexagonal-cell honeycomb core made by the process of applying the first adhesive component to the first group of peaks and applying the second adhesive component to the second group of peaks and stacking the structure so that the first adhesive component on the first group of peaks comes into contact with the second adhesive component on the second group of peaks. In addition, there is provided a hexagonal-cell honeycomb core made by the process of applying a cyanate ester and an epoxy to the first group of peaks and applying the epoxy and a catalyst to the second group of peaks. Also, there is provided a hexagonal-cell honeycomb core made by the process of applying the first adhesive component to the peaks on one side of the structure and applying the second adhesive component to the peaks on the other side of the structure.

In accordance with the present invention, there is provided a process for making a hexagonal-cell honeycomb core from a honeycomb half-cell structure. The process comprises the steps of applying a sticky adhesive to the peaks of the half-cell structure and stacking the half-cell structure while the adhesive remains sticky. The viscosity of the sticky adhesive of the present invention is at least 500 centipoise (cp) measured at the temperature at which the two sides of the half-cell structure are joined together. The application step comprises applying a first adhesive component 48 to a first group of peaks and applying a second adhesive component 50 to a second group of peaks. The first group of peaks is disposed on one side of the half-cell structure, such as the upper side of the half-cell structure, and includes the peaks coated with first adhesive component 48 as shown in FIG. 6. The second group of peaks is disposed on the other side of the half-cell structure, such as the lower side of the half-cell structure, and includes the peaks coated with the second adhesive component 50 as shown in FIG. 6. The step of applying the first adhesive comprises applying a cyanate ester and an epoxy to the first group of peaks on one side of the structure, and the step of applying the second adhesive comprises applying an epoxy, which is preferably the epoxy of the first adhesive but which may be a different epoxy, and a catalyst to the second group of peaks on the other side of the structure. The half-cell structure is cut into a plurality of sheets while the adhesive on the peaks remains sticky. The half-cell structure is cut across the diagonal surface. The sheets of half-cell structure are then stacked. A hexagonal half-cell honeycomb core such as core shown at 30 in FIG. 2 is thus produced.

The advantages offered by the adhesive system of the present invention include the following. The components do not set rapidly by themselves, so that there is adequate time after applying the adhesive to feed, cut, position and stack the sheets of half-cell structure. Also, each component has a long pot life, i.e., it does not degrade during the time it is held at an elevated temperature in the adhesive-applying apparatus for several hours during operation. In addition, the components are fluid enough (i.e., have a low viscosity) to spread in a thin layer, but are viscous enough not to run or drip. Furthermore, the components are sticky at the stacking temperature so the accurate position achieved during stacking is immediately retained against small disturbing forces until the adhesive components gel to form a strong bond. Also, the components form a strong bond quickly (i.e., they have a fast gel time of about one minute or less) when subjected to elevated temperatures. Each wet component has good adhesion with the honeycomb half-cell structure, which makes a thin uniform coating which is easy to apply. Also, the set adhesive adheres well to the half-cell structure to create a strong bond. In addition, the cured adhesive has high temperature resistance (i.e., a high glass transition temperature) of about 177 degrees C.

Moreover, the adhesive system of the present invention is solvent-less. In systems using solvents, as the solvents evaporate between the two half-cell sheets at the bond, bubbles may form that decrease bond strength. Also, the evaporated solvents may pose an environmental hazard that must be contained and scrubbed. The adhesive system of the present invention thus has the advantage over other adhesives which must include solvents to achieve low viscosity.

In addition, the adhesive system of the present invention is in a flowable, liquid form as the next sheet of half-cell structure is placed on the top of the core. This ensures that the adhesive components will mix properly and will flow into irregularities in the half-cell structure peaks and form a large area for bonding where the peaks are pressed together. A thick layer of low-viscosity adhesive wastes adhesive, flows into undesirable parts of the apparatus and the honeycomb core and produces a poor performance-to-weight product. A high-viscosity adhesive does not fill irregularities and mix adequately for a large area bond. If an alternate adhesive were used that is "dry", when the top half-cell sheet is placed on the honeycomb core, the adhesive may become sufficiently fluid to form a bond when heated, but this requires time during which mis-registration may occur. It would also require a higher pressure to produce a good contact bond, which pressure may excessively deform the honeycomb core.

An alternate embodiment of the present invention is illustrated in FIGS. 7A and 7B. This alternate embodiment includes the step of cutting the half-cell structure into a plurality of sheets. According to this alternate embodiment, the step of applying a first adhesive component includes applying a first adhesive component 48' to the peaks on each side of a first portion of the half-cell structure. The step of applying a second adhesive component includes applying a second adhesive component 50' to the peaks on each side of a second portion of the half-cell structure. The first and second adhesive components may be, but are not limited to the first and second adhesive components as described above. The stacking step as shown in FIG. 7B includes cutting a plurality of sheets from each portion and alternately placing a sheet from the first portion on a sheet from the second portion so that the peaks of the sheets of the first and second portions come into contact, thereby mixing the first and second adhesive components together. It should be noted that the method according to this embodiment of the present invention may be practiced when the half-cell structure is a continuous supply or is cut into sheets. Also in accordance with the present invention, there is provided a hexagonal-cell honeycomb core made by the process described with respect to FIGS. 7A and 7B.

Another alternate embodiment of the present invention is illustrated in FIGS. 8A and 8B. In this alternate embodiment, the step of applying a first adhesive component includes applying a first adhesive component 48" to the peaks of one side of a first portion of the half-cell structure and to the peaks of the other side of a second portion of the half-cell structure, where the first and second portions are separated by a fold line. Also, the step of applying a second adhesive component includes applying a second adhesive component 50" to the peaks of the other side of the first portion and to the one side of the second portion. As in the embodiment of FIGS. 7A and 7B, the first and second adhesive components may be, but are not limited to, the first and second adhesive components as described above. The stacking step includes folding the half-cell structure so that the first and second portions face each other and the first adhesive component on the peaks of the first and second portions is in contact with the second adhesive component on the peaks of the first and second portions. This stacking step is shown in FIG. 8B. Also in accordance with the present invention, there is provided a hexagonal-cell honeycomb core made by the process described with respect to FIGS. 8A and 8B.

The above-discussed processes for applying at least one adhesive component to half-cell structure may be implemented with adhesive-applying apparatus 24 as shown generally in FIG. 1. FIG. 9A is an enlarged, perspective view showing adhesive-applying apparatus 24 in greater detail.

The apparatus comprises at least one gravure roll for coating the half-cell structure with at least one adhesive component. A gravure roll is shown at 138 in FIG. 9A. The at least one gravure roll includes first gravure roll 138 as noted above for coating one side of the half-cell structure with the first adhesive component and a second gravure roll 144 for coating the other side of the half-cell structure with the second adhesive component. First gravure roll 138 is disposed in a first adhesive bath 43 which contains the first adhesive component. Second gravure roll 144 is disposed in a second adhesive bath 45 which contains the second adhesive component. First and second gravure rolls 138 and 144 each has a plurality of pits 141 and 143, respectively, formed therein. The first adhesive component is held in pits 141 on first gravure roll 138, and the second adhesive component is held in pits 143 on second gravure roll 144. Preferably, the first and second adhesive components are applied to the peaks of each side of the half-cell structure.

Figure 9B:
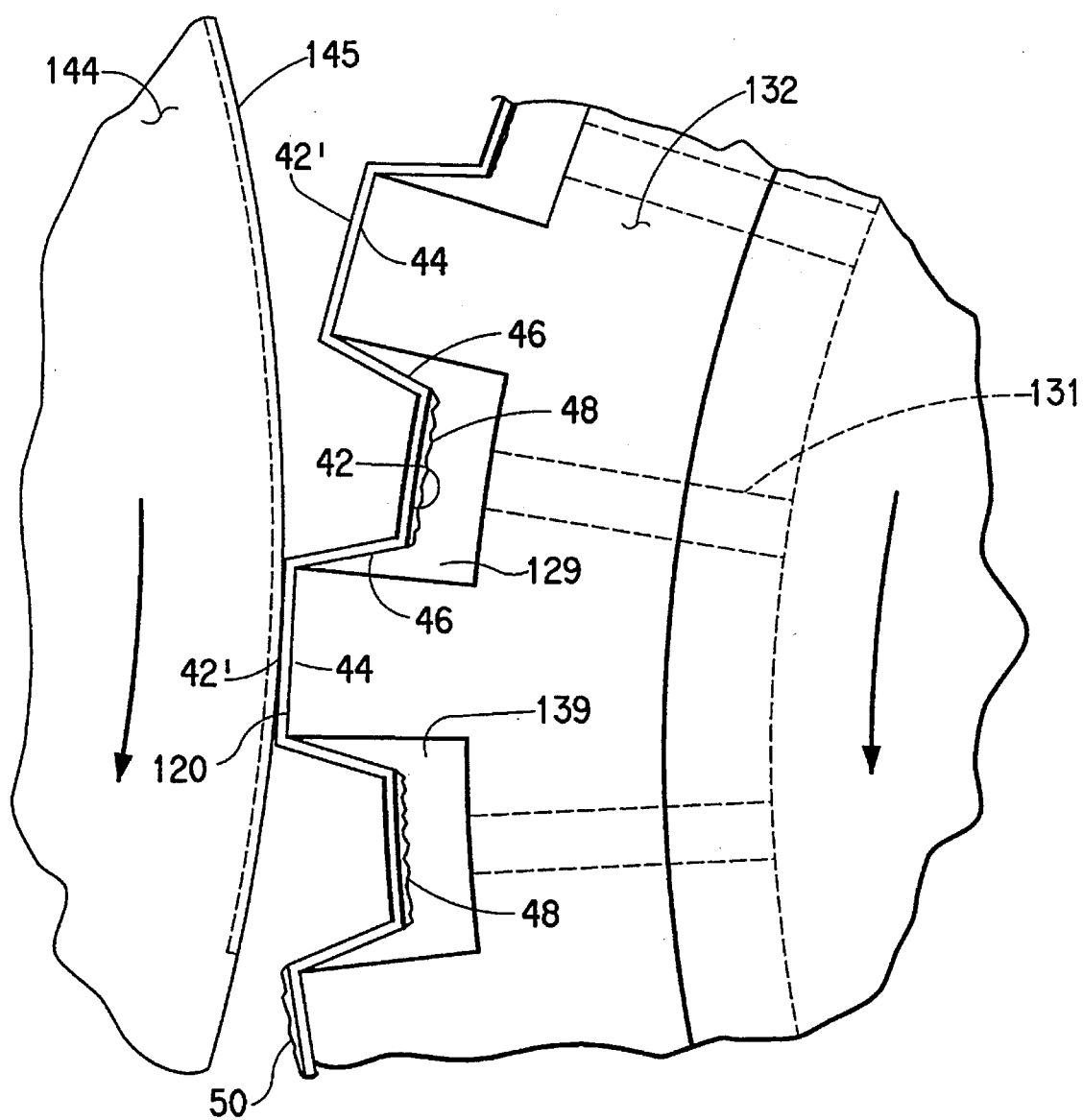
FIG. 9B is an enlarged portion of the half-cell structure in contact with a back-up roll and a gravure roll of the adhesive applying apparatus as shown in FIG. 9A.

The apparatus also comprises means for positioning the half-cell structure against the gravure roll. Preferably, the positioning means is resilient. Also preferably, the positioning means comprises at least one back-up roll. A back-up roll is shown at 130 in FIG. 9A. Back-up roll 130 includes a plurality of bars 137 on the surface thereof for supporting the half-cell structure. A space 127 is formed between each consecutive bar 137. In addition, the positioning means may comprise any other device for positioning half-cell structure against a gravure roll, including, but not limited to, a transfer head or a belt with teeth on it. The positioning means may also comprise a second back-up roll 132 for positioning the half-cell structure against the second gravure roll. Back-up roll 132 includes a plurality of bars 139 on the surface thereof for supporting the half-cell structure against second gravure roll 144. A space 129 is formed between each consecutive second bar 139. Preferably, first and second back-up rolls 130 and 132 are resilient; specifically, bars 137 and 139 are resilient. The depth of the spaces of the first and second back-up rolls is greater than the height of peaks 42 on the half-cell structure. Back-up rolls 130 and 132 contact the half-cell structure at a contact surface 120 and are relieved around spaces 129 as shown in FIG. 9B. The peaks on one side of the half-cell structure face away from bars 137 of first back-up roll 130.

Referring to FIG. 9B, this arrangement of contacting the half-cell structure at valleys 44 and not contacting it at peaks 42 is important to ensure uniform support at surface 120 and therefore a uniform coating of adhesive. Space 129 must provide clearance so second back-up roll 132 does not contact adhesive coating 48 on peak 42. Even when an adhesive coating is absent (as it is on first back-up roll 130), if space 129 matched the theoretical profile of peak 42 and diagonal surfaces 46, the actual height of the peak would vary from the theoretical, so a perfect match would not always occur. If peak 42 were higher than the "matching" depth of space 129, valley 44 would not fully engage contact surface 120, and uniform application of adhesive to peak 42' would not occur.

The peaks on the half-cell structure face away from the bars of each respective back-up roll, and the peaks contact each respective first and second gravure roll so that the first adhesive component contacts the peaks on the one side and the second adhesive component contacts the peaks on the other side to apply the first and second adhesive components to the half-cell structure. Specifically, valleys 44 on the one side of the half-cell structure are placed in contact with the bars on second back-up roll 132; peaks 42' on the other side of the half-cell structure face away from bars 139 on second back-up roll 132. Also, valleys 44' on the other side of the half-cell structure are placed in contact with the bars on first back-up roll 130; peaks 42 on the other side of the half-cell structure face away from bars 137 on first back-up roll 130. Accordingly, the first adhesive component contacts the peaks on the one side and the second adhesive component contacts the peaks on the other side of the half-cell structure to apply the first and second adhesive components to the half-cell structure.

First and second back-up rolls 130 and 132, respectively, are driven together at the same speed through suitable gearing by a motor 452. A motor 454 drives first gravure roll 138, and a motor 456 drives second gravure roll 144, so that the first and second gravure rolls are driven separately. The gravure rolls are preferably driven at the same speed as the back-up rolls. First gravure roll 138, first adhesive bath 43 and motor 454 are attached to a carriage 455 for reciprocation by a cylinder 457 in the direction of arrow 458 to press toward and away from back-up roll 130. Second gravure roll 144, second adhesive bath 45 and motor 456 are similarly disposed for movement in the direction of arrow 460 to press toward and away from back-up roll 132. When the gravure rolls are retracted from the back-up rolls, they can be independently driven by their respective motors 454 and 456 to agitate their respective adhesive baths.

A differential pressure system is shown at 436 in FIG. 9A and includes a vacuum source 437 and a pressure source 462. A vacuum is applied at each of spaces 127 and 129 through at least one vacuum hole 131, as shown in FIG. 9B only, on back-up roll 132 to hold the half-cell structure against or separate it from the first and second back-up rolls. By providing the vacuum holes on the non-contacting portion of the back-up rolls, the peaks of the half-cell structure are not deformed on contact surface 120, as they might be if the vacuum holes were located there. This is important to achieve good contact between the entire area of the peaks and the adhesive on the pitted surface of the first and second gravure rolls. The back-up rolls are in fluid communication with vacuum source 436 over about 270 degrees of rotation and with pressure source 462 over about 90 degrees of rotation, as determined by a pair of non-rotating partitions 134 and 136 formed within the back-up rolls. The elevated pressure ensures the half-cell structure is positively separated from the back-up rolls when the vacuum is removed at the partitions.

As shown in FIG. 9A, the half-cell structure is held tightly on back-up rolls 130 and 132 and is brought into contact with gravure rolls 138 and 144, respectively. Gravure roll 138 has a peripheral surface 140 and is disposed in contact with bath 43 of the first component of the two-part adhesive. Gravure roll 144 has a peripheral surface 145 and is disposed in contact with bath 45 of the second component of the two-part adhesive system. Peripheral surface 140 of gravure roll 138 is coated with a film of the first component, and peripheral surface 145 of gravure roll 144 is coated with a film of the second component. A doctor blade 142 wipes peripheral surface 140 of gravure roll 138 clean, leaving the adhesive component only in pits on the surface of gravure roll 138. A doctor blade 147 similarly wipes peripheral surface 145 of gravure roll 144. This arrangement accurately controls the adhesive thickness, and thus controls the quantity of the adhesive applied to the half-cell structure. The thickness of the layers of the first adhesive component and the second adhesive component, respectively, applied by the adhesive-applying apparatus of the present invention may be the same, but do not necessarily have to be so. The discrete spots of the adhesive components transferred to the half-cell structure by the adhesive-applying apparatus of the present invention coalesce into a continuous film, or areas of film, as the half-cell structure leaves gravure rolls 138 and 144.

As noted above, back-up rolls 130 and 132 are preferably made of a resilient material, such as rubber. Gravure rolls 138 and 144 are formed from a non-elastic metal. Thus, resilient back-up rolls 130 and 132 can be brought into pressing contact with non-resilient gravure rolls 138 and 144, respectively, and intimate contact between the half-cell structure and each gravure roll is assured. This arrangement controls the uniformity of the application of the adhesive.

As the half-cell structure is pressed against the surfaces of gravure roll 138, it contacts pools of the first adhesive component which collect in the pits of the roll, and the component is transferred to the peaks of the half-cell structure. As the half-cell structure leaves first back-up roll 130, it is inverted so that the top of the half-cell structure is facing second back-up roll 132. This allows the peaks on the other side of the half-cell structure to come into contact with the second adhesive component on the surface of gravure roll 144. The adhesive-coated half-cell structure is released from second back-up roll 132 and is guided into an unsupported loop, shown near the bottom of FIG. 9A. The continuous half-cell structure leaving adhesive applying apparatus 24 has sticky adhesive applied to the top and bottom peaks, and therefore these surfaces cannot be touched. The half-cell structure is released from vacuum source 437 and is guided and supported with a flow of air from a slot jet 438. The half-cell structure falls into a free loop as shown near the bottom of FIG. 9A. A sensor 440 detects the presence or absence of the loop. Sensor 440 is connected to distributed control system 38 as shown in FIG. 1.

In accordance with the present invention, there is provided a process of applying at least one adhesive component to a continuous supply of honeycomb half-cell structure. The process comprises the step of directing the half-cell structure to at least one gravure roll, such as first gravure roll 138 and second gravure roll 144. The process also comprises the step of positioning the half-cell structure against the gravure roll.

The process of the present invention further includes the steps of directing the half-cell structure through a wrap around a first back-up roll in a first direction and directing the half-cell structure through a wrap around a second back-up roll in a second direction. Preferably, the half-cell structure is directed through at least a 90 degree wrap in the first direction and through at least a 90 degree wrap in the second direction.

The positioning step of the present invention includes the sub-step of placing the valleys on one side of the half-cell structure in contact with a plurality of bars formed on the second back-up roll, where the peaks on the other side of the structure face away from the bars on the second back-up roll. The placing step includes placing the peaks on the one side of the structure in a space formed between the bars of the second back-up roll. The positioning step also includes the sub-step of placing the valleys of the other side of the structure in contact with a plurality of bars formed on the first back-up roll, where the peaks on the one side of the structure face away from the bars on the first back-up roll. The placing step includes placing the peaks on the other side of the structure in a space formed between the bars of the first back-up roll, where the width of the spaces of the first and second back-up rolls is about the distance between adjacent valleys of the half-cell structure, and the depth of the space is greater than the height of the peaks.

The process of the present invention further includes the step of placing a first adhesive component on a first gravure roll, such as gravure roll 138, and placing a second adhesive component on a second gravure roll, such as gravure roll 144. The first and second adhesive components may be, but are not limited to, the first and second adhesive components as described above. Specifically, the first adhesive component is placed in a plurality of pits, such as pits 141, extending below the surface of the first gravure roll. The second adhesive component is placed in a plurality of pits, such as pits 143, extending below the surface of the second gravure roll. The peaks of the one side of the structure are then pressed between the first back-up roll and the first gravure roll, thereby contacting the first adhesive component with the peaks on the one side. Also, the peaks on the other side of the structure are pressed between the second back-up roll and the second gravure roll, thereby contacting the second adhesive component with the peaks on the other side to apply the first and second adhesive components to the half-cell structure. The half-cell structure is held against a first back-up roll, such as 130, and a second back-up roll, such as 132, by a vacuum. The vacuum is applied to the spaces, such as 127 and 129, between the bars on the first and second back-up rolls.

As noted above, system 10 comprises cutting apparatus 26 for cutting the supply of half-cell structure into a plurality of sheets. The cutting apparatus of the present invention comprises means for cutting the honeycomb half-cell structure into a plurality of sheets. Preferably the cutting means comprises a blade 157 as shown in FIGS. 1 and 10A–C. Blade 157 comprises a razor blade which is coated with tungsten carbide or boron nitride for wear resistance. Blade 157 is guided across the half-cell structure by a conventional slide mechanism driven by an air cylinder. Alternatively, a wire cutter, a laser or a water jet or the like could be used as the cutting means. An alternate cutting arrangement to that of the present invention is a rotary cutter consisting of a disc rotated by an electric or air motor, so that a longer lasting cutting surface is available.

The cutting apparatus of the present invention also comprises means for positioning a length of the half-cell structure. Preferably, the positioning means comprises a conveyor 28 as shown in general in FIG. 1 and in greater detail in FIGS. 10–13 which positions a length of half-cell structure. The positioning means could also comprise any other mechanical, electrical, or electro-mechanical device or mechanism which accurately positions a length of half-cell structure and prepares it for cutting. The sheets are positioned for cutting across the diagonal surface as shown at line 150 in FIG. 6.

Further in accordance with the present invention, there is provided a process for cutting a honeycomb half-cell structure into a plurality of sheets. The process comprises the steps of positioning a length of the continuous supply of half-cell structure on a conveyor so that the diagonal surfaces of the half-cell structure are positioned adjacent a blade for cutting. The process also comprises the step of cutting across the diagonal surface to form the sheets. The process further includes the step of stacking the sheets onto each other so that the peaks on one side of a sheet contact the peaks on the other side of an adjacent sheet to form a honeycomb core. Accordingly, there is also provided a hexagonal-cell honeycomb core, such as that shown at 30 in FIG. 2, made by the process of cutting the structure across the diagonal surfaces thereof to form a plurality of sheets and stacking the structure by placing a sheet with the peaks on one side of the sheet in contact with the peaks on the other side of an adjacent sheet.

Figure 12:
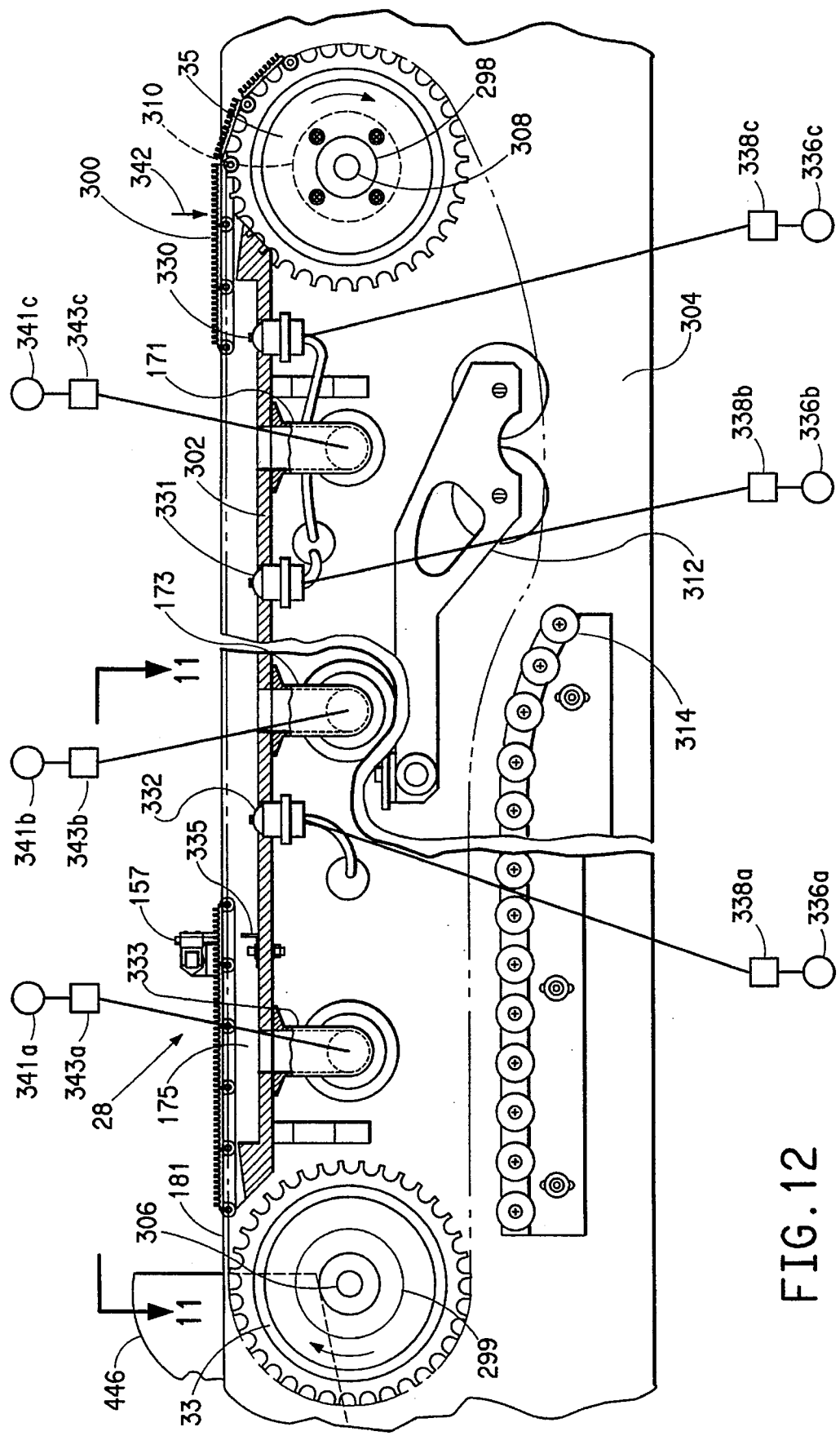
FIG. 12 is a cross-sectional view of the channel of the conveyor taken across lines 12—12 of FIG.
Figure 13:
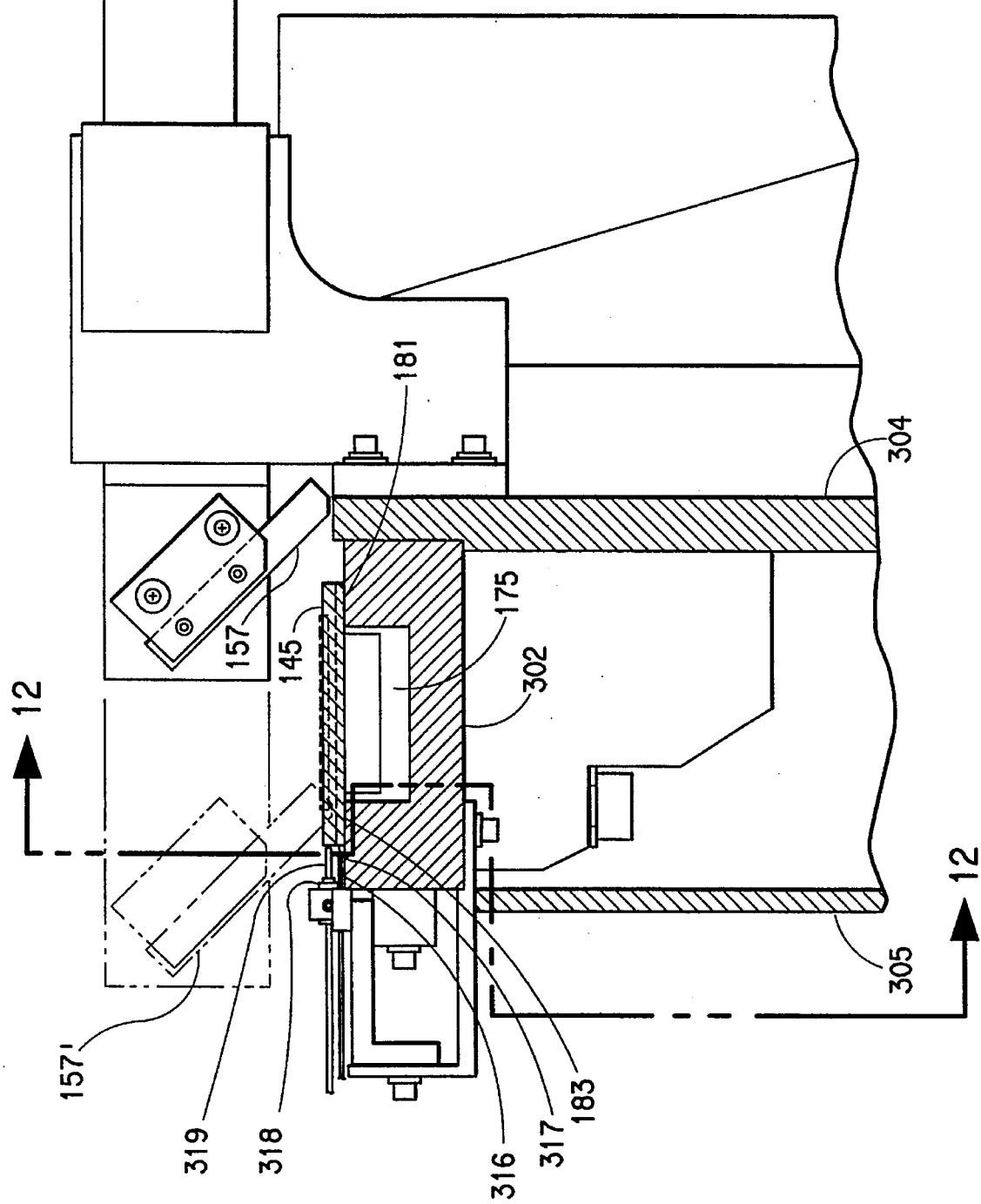
FIG. 13 is a cross-sectional view of the conveyor taken across lines 13—13 of FIG. 11.

Referring again to FIG. 9A, adhesive-coated half-cell structure 25 must be guided onto the top, flat portion of conveyor 28. The half-cell structure, which is coated with sticky adhesive, should be prevented from touching any surface. For this purpose, an air bar 442 and a pair of transparent side plates 444 and 446 as shown in FIG. 9A are attached to a conveyor frame 304 and a guard 305 as shown in FIG. 13, which in turn is mounted to conveyor frame 304. Frame 304 is shown in particular in FIGS. 12 and 13 and is the stationary part of the conveyor. Plates 444 and 446 guide and support the half-cell structure without contacting the sticky adhesive on the peaks. Plates 444 and 446 are spaced slightly further apart than the width of the half-cell structure. Air bar 442 has a plurality of holes 448 centrally located on its surface which are in fluid communication with a source of pressurized air, such as an air blower 449 as shown in FIG. 9A. When the loop is sensed by sensor 440, conveyor 28 advances the half-cell structure a fixed length and stops to allow cutting of a sheet of the half-cell structure. While the conveyor is stopped, the loop descends as the half-cell structure is advanced by adhesive applying apparatus 24, until the loop is detected by sensor 440. The conveyor is advanced again, or the adhesive applying apparatus is slowed or stopped if the conveyor cannot advance.

Figure 11:
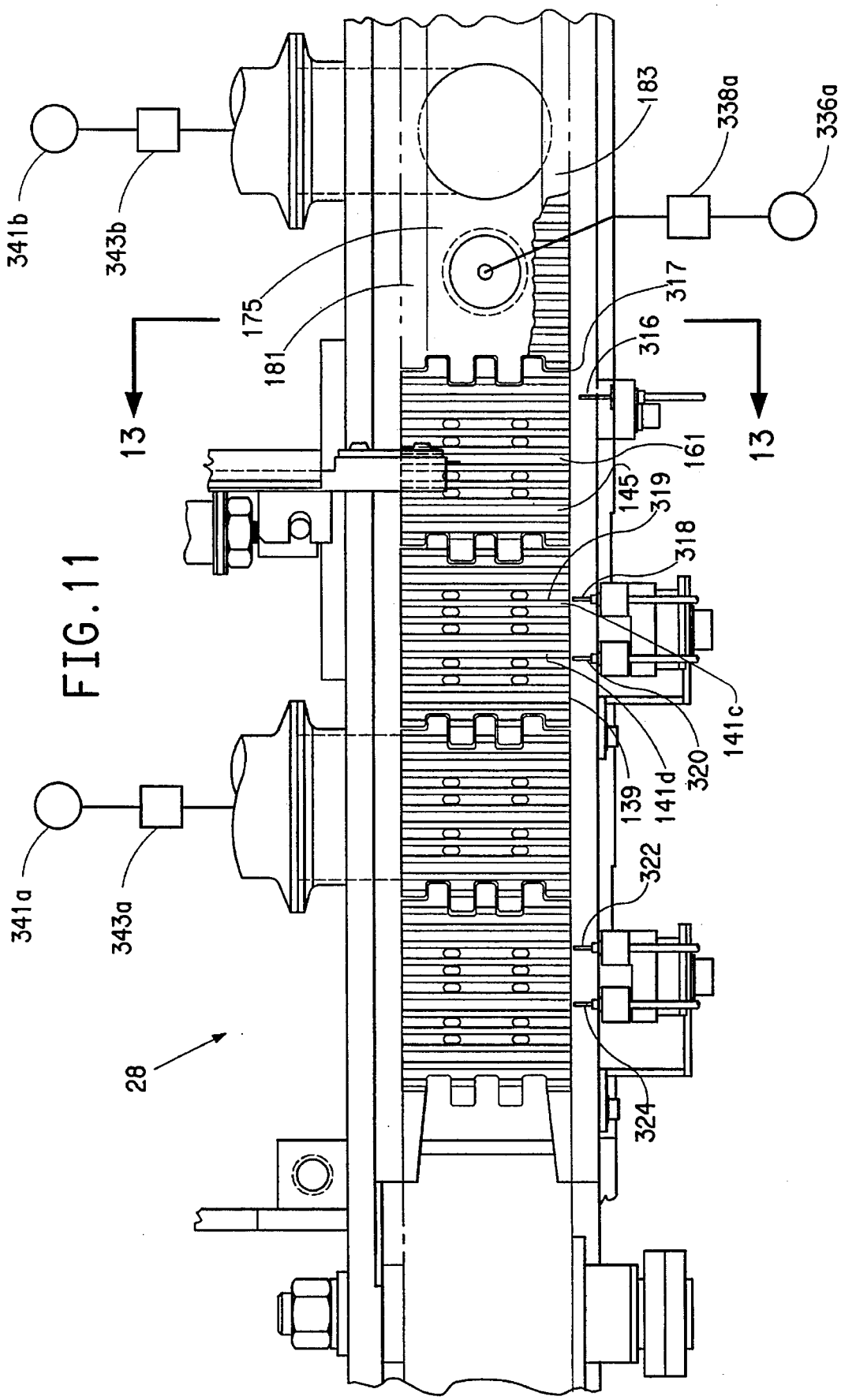
FIG. 11 is a partial plan view taken across lines 11—11 of FIG. 12 showing the conveyor and conveyor positioning sensors for locating the half-cell structure at a blade of the cutting apparatus of the present invention.

The conveyor comprises a plurality of connected platens 139 and 145 as shown in FIGS. 10A–10C and FIG. 11 which support the half-cell structure. Platens 139 and 145 ride on a U-shaped channel 302 as shown in FIGS. 12 and 13 which is fastened to frame 304 and which has a platen manifold 175 provided therein. A plurality of surfaces 181 and 183 are provided on channel 302 for supporting platens 139 and 145. Platens 139 and 145 are connected at a pivot 146 as shown in FIGS. 10B and 10C. Platens 139 and 145 comprise a plurality of support bars, such as 141a–141f as shown in FIGS. 10A–10C, which have about the same pitch as bars 60a, 60b, 62a and 62b of half-cell forming apparatus 20. A plurality of spaces, such as 143a and 143b, is formed between each consecutive bar as shown in FIGS. 10A–10C. Support bars 141a–141f of the platens contact the valleys on the other side, or bottom, of the half-cell structure.

The cutting apparatus of the present invention incorporates special considerations to achieve accurate alignment of adjacent sheets of half-cell structure when they are stacked on top of each other. The number of bars on each consecutive platen alternates between an odd and an even number. In the preferred embodiment, conveyor platens 139 and 145 are 10 ½ pitches long from pivot to pivot as shown at 133 and 135, respectively, in FIG. 10A. The platens have different numbers of bars and spaces. For example, platen 145 may have 10 bars and 11 spaces, such as 141a and 143b, respectively, and platen 139 may have 11 bars and 10 spaces. The conveyor index in the direction as designated by arrow 151 as shown in FIG. 10B is constrained to be an odd number of platens to achieve the one-half pitch increment, so that blade 157 alternately cuts first on one side of a first predetermined bar, such as a downstream side, as illustrated at 147 in FIG. 10B and then on one side of a second predetermined bar, such as an upstream side, as illustrated at 149 in FIG. 10C. The blade remains fixed along the conveyor, and the conveyor advances a repeatable distance. This distance must always be equal to an integer plus one-half of the pitch of the half-cell structure. Stacker arm 31 must move back and forth laterally one-half pitch, as between points 153 and 155 in FIGS. 10B and 10C, to pick up alternate sheets of half-cell structure.

Platens 139 and 145 are connected in an endless chain 300 which comprises support bars 141a–141f. Platens 139 and 145 are driven and supported by a chain idler sprocket 33 and a chain drive sprocket 35 as shown in FIG. 12. A shaft 306 is supported on frame 304 and holds chain idler sprocket 33. A shaft 308 is also supported on frame 304 and holds chain drive sprocket 35. A drive motor/gear reducer 310, shown attached behind frame 304, drives shaft 308. The motor of motor/reducer 310 is a DC servo-motor that can be precisely controlled. A tensioner 312 and a plurality of support rollers 314, which are attached to frame 304, keep chain 300 taut. As shown in FIG. 12, a drag brake mechanism 299 is attached to frame 304 and acts on idler sprocket 33 to keep chain 300 under tension as it advances.

Blade 157 is provided near the inlet end of conveyor 28 as shown in FIG. 1. When sensor 440 as shown in FIG. 9A senses half-cell structure 25, conveyor 28 moves to the right as shown in FIG. 1. For example, the conveyor moves to the right a distance of 220 ½ half-cell structure pitches, which pulls about 1.2 meters of continuous half-cell structure out of the loop at the exit end of adhesive-applying apparatus 24. The conveyor then stops, and blade 157 traverses the half-cell structure across space 143b between two adjacent support bars 141a and 141b as shown in FIGS. 10A and 13, where the advanced blade is shown at 157'. This cuts the half-cell structure at a position as shown at line 150 in FIG. 6 midway between a peak and a valley across a diagonal surface of the half-cell structure, so a discrete sheet of half-cell structure can be picked up by stacker arm 31. Stacker arm 31 then moves over the sheets on the conveyor and stops closely spaced from the sheets. Conveyor 28 ensures that the continuous half-cell structure is accurately positioned for cutting into sheets by blade 157 and that the cut sheet is positioned for pick-up by stacker arm 31. Accurate stopping of the conveyor with the half-cell structure held on bars 141a–141d of the platens is particularly important so that the half-cell structure is cut along the diagonal surface. This positioning must be independent of tolerance accumulation from bar to bar and platen to platen, independent of wear that would effect the dimension between platens, and independent of platen and drive motor inertia and friction variables.

The honeycomb half-cell structure is cut into sheets after the adhesive is applied and while the adhesive is still wet and sticky. The cut occurs across diagonal surface 46 between the adhesive-coated peaks along line 150 so that the blade does not contact the adhesive and become covered with wet, sticky adhesive that would prevent accurate cutting. It should be noted that the cut along the diagonal surface of the present invention is not dependent on the application of adhesive. In either case where adhesive is or is not applied, cutting the half-cell structure along the diagonal surface achieves the advantage of preventing waste of half-cell structure. A cut can be made at the beginning of one sheet and at the end of the next sheet after advancing by a distance equal to an integer plus one-half the pitch of the half-cell structure so that the edges line up, and no trimming is necessary. In addition, there is no need to flip the sheets of half-cell structure with the present invention, which reduces operation time and cost, while still having the ends of the sheets align for accurate guiding in the stack holder. Cutting on the diagonal surface of the half-cell structure also eliminates the possibility of getting adhesive on the blade or on the end guides for each sheet as they are stacked, since adhesive is never applied to the diagonal surfaces. In contrast, when cuts are made on the surfaces where adhesive is applied, the blade must cut through the adhesive, thereby accumulating adhesive, which must periodically be cleaned off. Also, as the cut sheet is stacked, the ends of the sheets which are cut along the bond area curl up as they contact end guide plates. This curling up exposes the adhesive to the end guide plates, which causes sticking of the sheet and/or contaminates the plates for the next sheet.

The apparatus of the present invention, by sensing the position of the bars in conjunction with controlling the motor speed of the conveyor, ensures accurate stopping and positioning of the half-cell structure for cutting. Thus, in accordance with the present invention, the means for positioning the half-cell structure for cutting comprises means for alternately positioning a bar adjacent one side of the cutting means and the other side of the cutting means to cut across the diagonal surfaces of the structure. Preferably, the means for alternately positioning a bar comprises a plurality of sensors 316, 318, 320, 322, 324, a motor of motor/reducer 310, a rotary encoder 298 as described below and distributed control system 38 as described above. Alternatively, the means for alternately positioning may comprise any mechanical or electrical mechanism for positioning a bar on the conveyor. As shown in FIG. 11, conveyor 28 is provided with a platen sensor 316, a plurality of bar sensors 318 and 320 for sensing where to stop a 10-bar platen, such as platen 145, and a plurality of bar sensors 322 and 324 for sensing where to stop an 11-bar platen, such as platen 139. All of sensors 316, 318, 320, 322 and 324 are mounted on channel 302. As shown in FIG. 13, sensor 316 is mounted on channel 302 at an elevation so it sees a trailing edge 317 of a platen; bar sensors, such as 318 as shown in FIG. 13, are mounted on channel 302 at an elevation so they see an edge 319 of the bars on each platen. During advancing of the continuous half-cell structure, chain 300 is traveling at high speed, so it must be slowed before stopping. Conveyor 28 is indexed the approximate distance of a sheet, as determined for instance by rotary encoder 298, which is disposed on shaft 308 as shown in FIG. 12. The motor of motor/reducer 310, encoder 298 and sensors 318, 320, 322 and 324 are operatively connected to distributed control system 38. Sensor 316 senses when the trailing edge of the platen preceding the one for cutting has passed. When sensor 316 senses the trailing edge of the last platen preceding the one where cutting is to occur, the motor of motor/reducer 310 is commanded by distributed control system 38, as shown in FIG. 1, to run at a slow speed. Sensor input from all sensors is then monitored. If the distributed control system expects to cut on a ten-bar platen, sensors 318 and 320 will both be "on" when sensor 318 sees the leading edge of bar 141c and sensor 320 has not yet seen the space beyond the trailing edge of bar 141d several bars away. The choice of which bars to look at depends on the space available on channel 302 for mounting and adjusting the sensor hardware. At this point, the motor of motor/reducer 310 is commanded to stop. When stopped, bars 141a and 141b on platen 145 downstream of the sensors are properly positioned at the blade for cutting across the diagonal surface of the half-cell structure at the upstream side of bar 141a on platen 145 as shown in FIG. 10B. The use of two bar sensors and a platen sensor for determining when to stop the conveyor is useful for providing a large margin of variability for response of distributed control system 38 to the sensors. In addition, they can detect malfunctions of the conveyor if sensor 320 sees beyond the trailing edge of a bar, which indicates the conveyor has moved too far and is inaccurately positioned for cutting. If a very fast control system were used, only one sensor, such as sensor 316 which senses the edge of a platen, could be reliably employed to stop the conveyor accurately, and other means could be used to detect malfunctions.

With the conveyor accurately stopped, the blade can cut across the half-cell structure on 10-bar platen 145, thereby separating a sheet of half-cell structure and making it available for stacking. When this sheet is transferred to the stacking apparatus, the conveyor is free to advance the half-cell structure forward one sheet length again by indexing a plurality of platens and this time stopping at an 11-bar platen 139. To stop at an 11-bar platen, sensors 322 and 324 are employed in conjunction with platen sensor 316 to monitor the position of a different pair of bars, which are at a different position spaced one-half pitch of the half-cell structure away from the bars sensed by sensors 318 and 320 used on the previous stop. The process for stopping is the same as previously described, except sensors 322 and 324 are employed instead of sensors 318 and 320. When stopped, bars 141a and 141b on 11-bar platen 139 downstream of the sensors are properly positioned at the blade for cutting across the diagonal surface at the upstream side of bar 141b on platen 145 as shown in FIG. 10C.

The cutting apparatus of the present invention further includes a differential pressure system for holding the half-cell structure on the conveyor while advancing the half-cell structure and cutting the continuous structure into sheets and for disengaging the sheets from the conveyor during pick-up by stacker arm 31. The differential pressure system is shown generally at 334 in FIG. 1. and includes, as shown in FIG. 12, a plurality of pressure sources 336a–c, valves 338a–c, blow-off vents 330, 331 and 332, vacuum sources 341a–c, valves 343a–c and vacuum ports 171, 173 and 333. Pressure sources 336a, 336b and 336c are connected to valves 338a, 338b and 338c, respectively, for controlling the air flow therefrom to blow-off vents 332, 331 and 330, respectively. Vacuum sources 341a, 341b and 341c are connected to valves 343a, 343b and 343c, respectively, for controlling the vacuum thereto to vacuum ports 333, 173 and 171, respectively. Valves 343a–c and 338a–c are controlled by distributed control system 38. For explanation, only three vacuum ports and three blow-off vents are described, but more or less could be used. Each vacuum source can be a separate vacuum blower or pump, or a single pump can be manifolded to all of valves 343a–c. Similarly, each pressure source can be a separate compressor or blower, or a single compressor can be manifolded to all of valves 338a–c. The vacuum applied through ports 171, 173 and 333 holds the half-cell structure on the conveyor until the structure is cut and stacker arm 31 is ready to pick up the cut sheet, at which time the vacuum applied through ports 171 and 173 is turned off and the pressure to blow-off vents 330, 331 and 332 is turned on to transfer the sheet to the stacker arm. The vacuum applied through port 333 remains on continually to hold the leading edge of the half-cell structure on the conveyor.

At least one of spaces 143a formed between platen bars 141e and 141f includes an opening disposed in fluid communication with the differential pressure system. The opening may comprise a plurality of ports 159 as shown in FIGS. 10A and 10B. Clearances associated with joints 146 between platens also act as ports. Preferably, at least one space has at least one port formed in the bottom surface thereof, and the port is in communication with the differential pressure system. As shown in FIG. 10A, ports 159 are formed in the bottom of the spaces. The spaces between the bars comprise at least one cutting space 143b as shown in FIG. 10A, and the blade and the cutting space are disposed in horizontal alignment when the bar is positioned at the blade. A vacuum from differential pressure system 334 is applied through ports 159 in each space on both sides of cutting space 143b. Preferably, the vacuum source is applied only through the ports in each space on both sides of the cutting space. If there is a vacuum applied at the space where the cut is made, it would pull the cut end down after cutting, so the sticky adhesive-coated peak would contact the side of a bar and would stick there, which is undesirable.

The plurality of vacuum ports 171, 173 and 333 and the plurality of blow-off vents 330, 331 and 332 are shown in FIGS. 11 and 12 mounted to channel 302 and are in fluid communication with platen manifold 175. A baffle 335 is provided in manifold 175 as shown in FIG. 12 to shield the effects of adjacent blow-off vent 332 from the vacuum supplied by vacuum port 333. This arrangement of individually controlled vacuum ports and blow-off vents permits independent off-on operation of each vacuum port and blow-off vent without losing control of the leading edge of the continuous half-cell structure.

In accordance with the present invention, there is provided a process for cutting a honeycomb half-cell structure into a plurality of sheets. The process comprises the steps of positioning a length of the half-cell structure so that the diagonal surfaces of the half-cell structure are positioned for cutting adjacent a blade, such as blade 157, and cutting the half-cell structure across the diagonal surface to form the sheets. The half-cell structure is cut across the diagonal surface alternating between one side and the other of a predetermined bar, such as platen bars 141a and 141b. The half-cell structure is positioned on a conveyor, such as conveyor 28 as described above, and the conveyor is advanced by an integer number plus one-half of the pitch of the half-cell structure. A vacuum, such as that from vacuum sources 341a–c, is applied to the half-cell structure via ports 159 to hold the half-cell structure in place while it is cut and advanced. The structure is placed on the conveyor, which, as described above, has a plurality of bars, such as 141a–141d, which contact the valleys on one side of the half-cell structure and a space, such as 143a and 143b, between each consecutive bar. At least one of the spaces comprises a cutting space, such as cutting space 143b, which is disposed in horizontal alignment with the blade when the conveyor stops advancing. The conveyor is stopped at the cutting space, and the vacuum is applied through the ports in each space adjacent the cutting space. It is preferable that the vacuum is applied only through the ports in each space on both sides of the cutting space.

Further in accordance with the present invention, there is provided a honeycomb core made by positioning the half-cell structure so that the diagonal surfaces of the half-cell structure are positioned adjacent a blade for cutting and by cutting the half-cell structure across the diagonal surface to form the sheets. This core is illustrated in FIG. 2 as described above, where cut diagonal surfaces 46, 46' of the sheets are aligned at the edge of the core at 297 as a direct result of the assembly process.

The principles employed in the conveyor of the present invention may be extended to any system for advancing the leading edge of a supply of corrugated web, which may be other than honeycomb half-cell structure. Thus, in accordance with a further embodiment of the present invention, there is provided a system for advancing the leading edge of a supply of corrugated web which has a plurality of alternating peaks and valleys, where the system positions the web for a secondary operation. Such a system is shown generally at 28 in FIGS. 11 and 12. The secondary operation may include a cutting operation to cut a discrete sheet from the web, such as that performed by blade 157 as described above. Other secondary operations may replace the cutting operation or be in addition to the cutting operation, such as a marking operation, an adhesive-applying operation or a folding operation.

The advancing system of the present invention comprises endless loop conveying means including a plurality of spaced support bars for contacting the valleys of the web, where the conveying means has an entrance end and an exit end. Preferably, the conveying means comprises a conveyor, such as conveyor 28 as described above and as shown in FIGS. 1 and 10–13, which includes spaced support bars, such as 141a–141f as described above, for contacting the valleys of the web. In the advancing system of the present invention, it is preferable that they contact only the valleys of the web. A space, such as spaces 143a and 143b as described above, is formed between each consecutive bar. The space has a depth greater than the height of each peak of the web. The conveyor of the advancing system of the present invention comprises a plurality of platens, such as platens 139 and 145, where the support bars are formed on the platens. The number of bars on each consecutive platen alternates between an odd and an even number.

The advancing system of the present invention further includes holding means for holding the web against the support bars. Preferably, the holding means comprises at least one vacuum source, such as vacuum sources 341a–c as described above, for holding the web against support bars 141a–f. The advancing system of the present invention also includes means for disengaging the web from the support bars. Preferably, the disengaging means comprises at least one pressure source, such as pressure sources 336a–c, for disengaging the web from support bars 141a–141f. The advancing system of the present invention further includes means for selectively activating and de-activating the holding means and the disengaging means to remove the cut sheet of web from the support bars. Preferably, the means for selectively activating and de-activating the holding means and the disengaging means comprises a plurality of valves 338a–c and 343a–c, which function as described above.

The advancing system of the present invention also comprises advancing means for repeatedly advancing the conveying means and the leading edge of the web from the entrance end of the conveying means to the exit end thereof. The advancing means preferably comprises a motor, such as the motor of motor/reducer 310 as described above, and a distributed control system, such as distributed control system 38 as described above. The advancing system of the present invention also comprises stopping means for repeatedly stopping the advancing means after a predetermined number of support bars have advanced past a position for applying the secondary operation to the web. Preferably, the stopping means comprises a rotary encoder, such as rotary encoder 298 as described above, and a sensor, such as any one of sensors 318, 320, 322 and 324 as described above, for sensing the presence of a support bar near the position for applying the secondary operation. The motor, the encoder and the sensor of the advancing system of the present invention are operatively connected to distributed control system 38.

In accordance with the present invention, there is provided a method of advancing the leading edge of a supply of corrugated web having a plurality of alternating peaks and valleys and of handling the web for a secondary operation. The method comprises the step of engaging the leading edge of the web at an entrance end of a conveyor, such as conveyor 28 as described above. The entrance end of the conveyor can be anywhere from near idler sprocket 33 where the web first contacts the conveyor to just adjacent the secondary operation, such as adjacent blade 157 as shown in FIG. 12. The leading edge of the web is advanced as the leading edge moves from the entrance end to an exit end of the conveyor a distance equal to an integer plus one-half the pitch of the web. The conveyor is advanced by a distance equal to an odd number of conveyor platens. The valleys of the web contact a plurality of support bars formed on the conveyor for supporting the advancing web. It is preferable that only the valleys of the web contact the support bars. The advancing web is held against the support bars and is stopped to position the web adjacent the secondary operation at the entrance end of the conveyor. The secondary operation includes cutting a discrete sheet from the web, such as with blade 157.

The holding step includes activating at least one vacuum source, such as vacuum sources 341a–c. The method of the present invention further includes the step of de-activating the vacuum source to release the cut sheet from the conveyor, and activating at least one pressure source, such as pressure sources 336a–c, to remove the cut sheet from the conveyor. The activating and the de-activating steps are done progressively from one end of the conveyor to the other to progressively remove the cut sheet from the conveyor.

Figure 14:
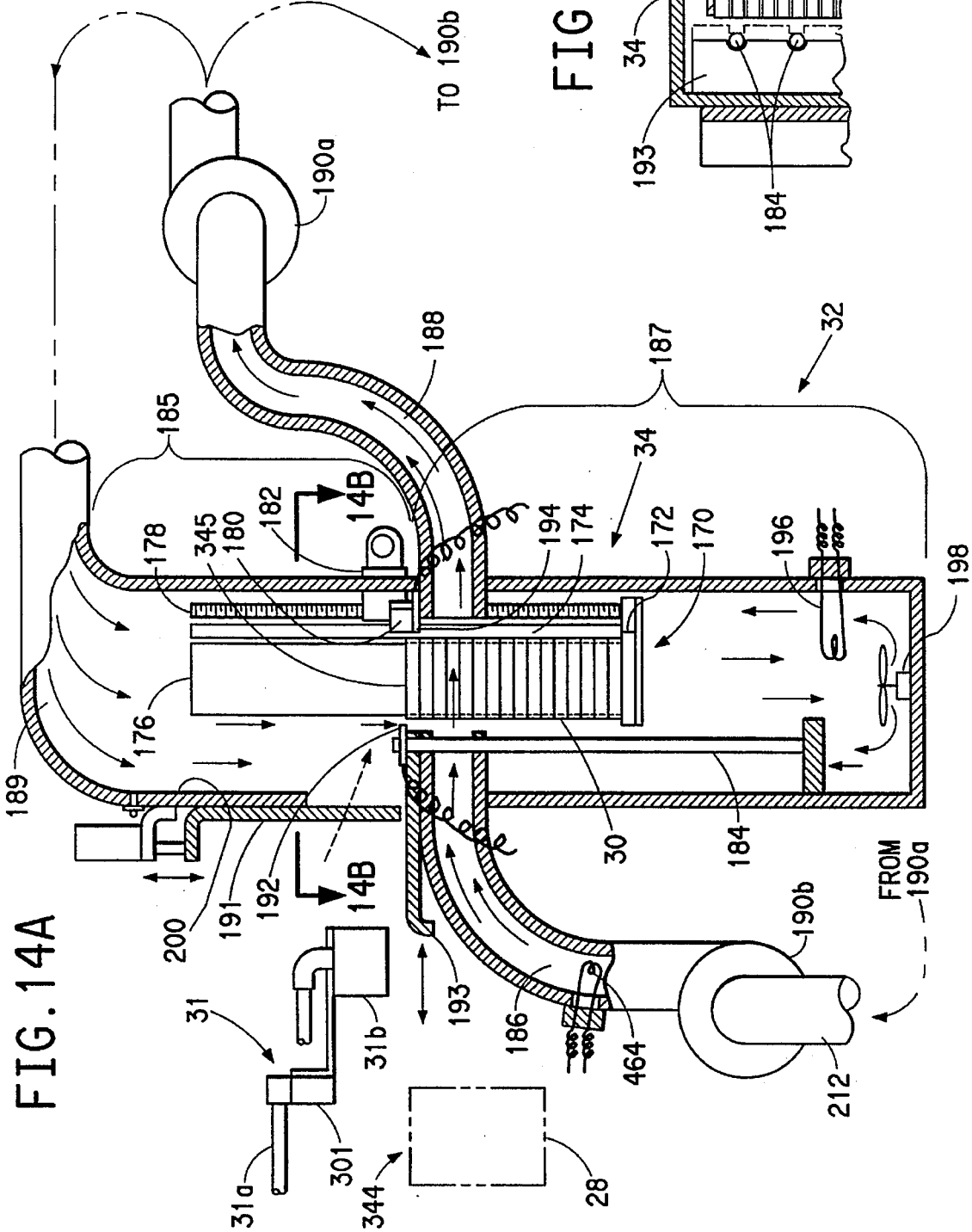
FIG. 14 is a partial cross-sectional view taken across lines 14B—14B of FIG. 14A showing the end guide plates for the core in a stack holder of the stacking apparatus.
Figure 15:
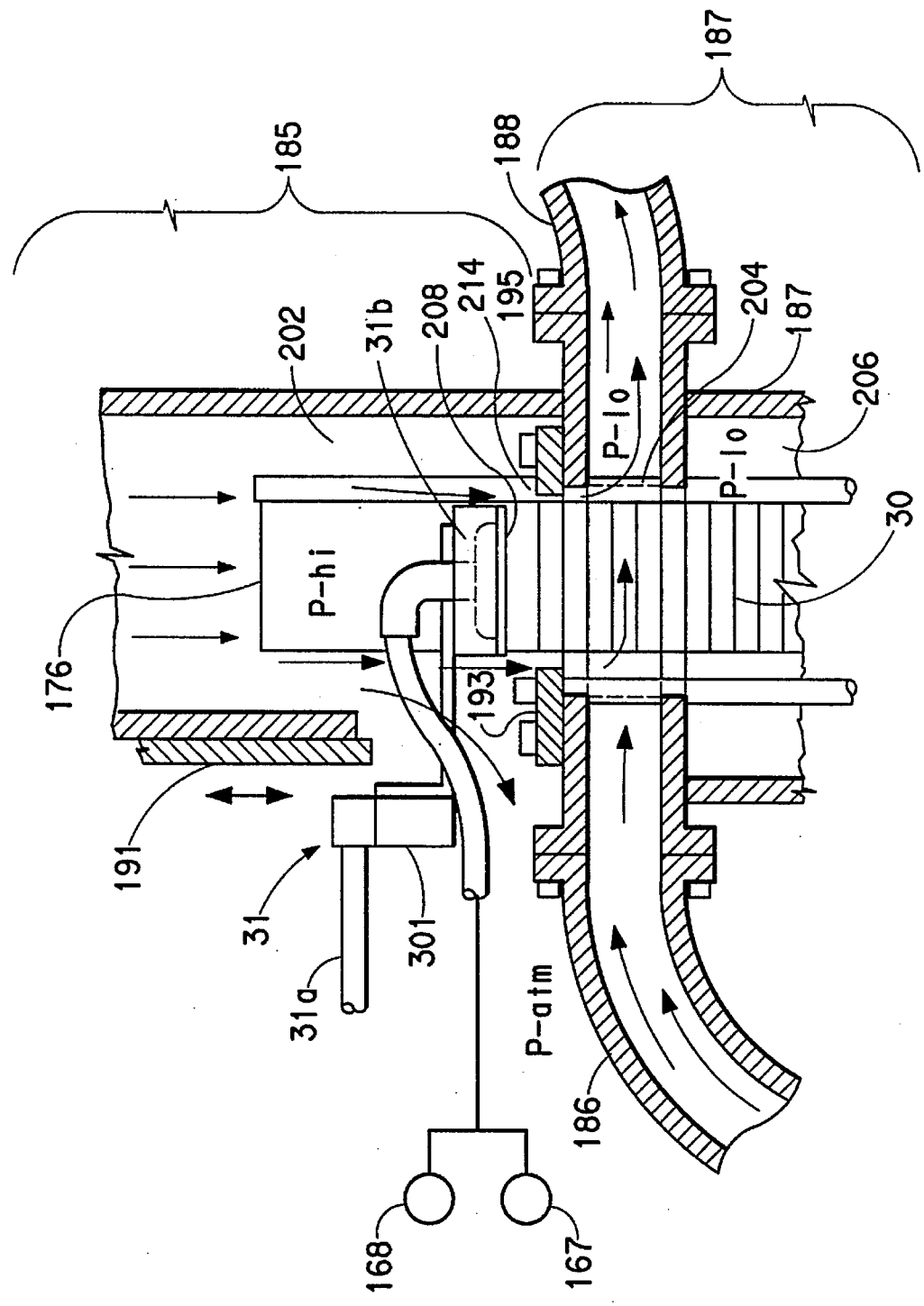
FIG. 15, is an enlarged cross-sectional view of the stack holder of FIG. 14A showing the differential pressure zones of the air in the stack holder.

In accordance with the present invention, there is provided a transfer head for holding a sheet of honeycomb half-cell structure. Referring to FIGS. 10B, 10C and 14A, stacker arm 31 includes an extension rod 31a and a transfer head 31b attached to the extension rod. Extension rod 31a is attached to and is moved by a cylinder mechanism 31c as shown in FIG. 1 for motion between a pick-up position 344 at conveyor 28 and a deposit position 345 at stack holder 32. Cylinder 31c is supported by conveyor frame 304. Transfer head 31b comprises a plurality of support bars 162 and 163 that support the sheets of half-cell structure along the valleys thereof and provide clearance with the peaks of the sheets, as do the bars of the forming apparatus and the conveyor. At least one space 161 is formed between each support bar, where the width of each space is about the distance between adjacent valleys of the half-cell structure and the depth of the space is greater than the height of the peaks. Within each bar are ports 164 and 165 spaced along the length of each bar in fluid communication with a transfer head manifold 166. Manifold 166 is disposed in transfer head 31b as shown in FIG. 10B. The transfer head of the present invention also includes a differential pressure system for holding the sheets against the support bars and disengaging the sheets therefrom. The differential pressure system comprises a valved vacuum source 167 and a valved pressure source 168 as shown in FIG. 15. Manifold 166 is in fluid communication with vacuum source 167 or pressure source 168, so that the sheets of half-cell structure can alternately be held securely by vacuum to bars 162 and 163 or blown off the bars by pressure.

At the end of extension rod 31a is a two-axis shift mechanism 301 as shown in FIGS. 14A and 15 that moves transfer head 31b up and down and side to side relative to rod 31a. The up position is used to receive the half-cell sheet from the conveyor, and the down position is used to place the sheet on the top of the stack of sheets of the core. During the travel between the conveyor and the stacking apparatus, transfer head 31b is in the up position. The side positions shift the head by one-half of a half-cell pitch in the preferred embodiment to pick up alternate half-cell sheets from the 10-bar and 11-bar platens on the conveyor and place them in the stacking apparatus.

Chain 300, which comprises platens 139 and 145 with bars 141a–141f, must have clearances so that the platens pivot freely relative to each other at pivot 146 as they travel around sprockets 33 and 35. There is some variation in dimensions from pivot to pivot and in the clearances at the pivots. Such pivots also eventually wear, and the tolerances and clearances may change. These variations may cause slight differences between the pitch of chain 300 compared to the pitch of transfer head 31b. If transfer head 31b were to be lowered into the spaces between chain platen bars to pick up the half-cell structure by engaging the valleys, there may be mechanical interferences between bars 162 and 163 on the transfer head and bars 141a–141f on the platens caused by these variations. To avoid this, transfer head 31b remains in a position above platen support bars 141a–141f, and the cut sheet of half-cell structure is blown off platen chain 300 and sucked onto the transfer head.

When it is desired to transfer a sheet of half-cell structure from the conveyor to the transfer head, the transfer head is positioned above the conveyor, and distributed control system 38 begins the transfer of the sheet. The present invention employs a progressive transfer of the sheet of half-cell structure from platen support bars 141a–141f to transfer head bars 162, 163 by sequential vacuum release and pressure blow-off from one vacuum zone to the next along the conveyor. Transfer head vacuum 167 is turned on to receive the sheet. The first step in the transfer process of the present invention is to turn off vacuum to port 171 and to simultaneously turn on vents 330 and 331. This blows off the end of the sheet, which is positioned as shown at 342 in FIG. 12 at the drive end of conveyor 28, and the sheet moves up and is captured by the vacuum on transfer head 31b created by vacuum source 167 over that portion of the sheet. The next single vent and port are de-activated and activated to blow up the next portion of sheet and so on until, at the end of the conveyor where blade 157 is disposed, vacuum to port 173 is turned off, pressure to vent 332 is turned on, and the last portion of the sheet is transferred to the transfer head. This process is very quick and takes less than 0.25 seconds. This ensures accurate transfer of the sheet even though the platen chain pitch and transfer head pitch may differ. Alternatively, the vacuum sources could remain on and sufficient pressure could be supplied to overcome the vacuum applied thereby. During progressive transfer of the sheet, valve 343a remains on continuously so that a vacuum is continuously applied to hold the leading edge of the half-cell structure in place on the conveyor. The vacuum release and pressure blow-off to the zones moves from right to left along the conveyor of FIGS. 1, 11 and 12, and the sheet of half-cell structure is progressively transferred from right to left onto stacker arm 31. It should be noted that even though the operation of the conveyor and transfer head is described from right to left, it is within the scope of the present invention to operate the system of the present invention from left to right.

By progressively transferring the cut sheet, the sheet is never all freely released; it is always engaged with one, the other or both of conveyor 28 and stacker arm 31. This ensures accurate, repeatable placement of the sheet on the arm. This accuracy is critical when arm 31 places the next top sheet of half-cell structure on the already started core 30. Stacker arm 31 is positioned over the core and is lowered to place the transferred sheet in contact with the core. When the transferred sheet is placed in contact with the top sheet of the core, the sticky adhesive components lightly stick together, thereby preserving the accuracy of placement. Vacuum source 167 on transfer head 31b is relieved, and air pressure from pressure source 168 is momentarily applied to ports 164, 165 in transfer head bars 162 and 163, thereby releasing the sheet. The stacker arm is then retracted upwardly.

In accordance with the present invention, there is provided an apparatus for stacking a plurality of sheets of half-cell structure to make a hexagonal-cell honeycomb core. As noted above, the stacking apparatus of the present invention is shown at 29 in FIG. 1. The apparatus comprises means for stacking the half-cell structure so that as one sheet of the half-cell structure is placed on the top of a stack comprising at least one sheet of the half-cell structure, the peaks of one sheet contact the peaks of an adjacent sheet. It should be noted that the half-cell structure may, in this context, comprise discrete sheets or a continuous supply. The stacking means comprise stacker arm 31 and stack holder 32. FIGS. 14A, 14B and 15 are cross-sectional views of the stack holder of the present invention in greater detail. As shown in FIG. 14A, the stack holder comprises an enclosure surrounding the stacked sheets for restricting the flow of air around the periphery thereof. An enclosure is shown at 34 in FIG. 14A which comprises an upper portion 185 disposed above the top of the stack of sheets and a lower portion 187 disposed below the top of the stack.

The stacking apparatus of the present invention further includes an elevator 170 as shown in FIG. 14A that comprises a platform 172 having a plurality of guide rods 174 and an elevating screw 178. The stacking apparatus also includes a plurality of end guide plates 176 disposed in contact with the sides of the core. Each guide rod 174 passes through a linear bearing 180, and screw 178 passes through a driven nut 182, which drives the screw and attached platform 172, plates 176 and rods 174 up and down. A plurality of auxiliary guide rods 184 are fixed to lower portion 187 of stack holder enclosure 34. When the sheets of half-cell structure are placed in the stack holder elevator, they are placed on the back of platform 172 in contact with guide rods 174 and spaced from auxiliary guide rods 184.

The stacking apparatus of the present invention also comprises differential pressure means disposed beneath the stack for reducing the air pressure surrounding the stack to a pressure below the air pressure on the top of the stack for pressing the sheets together to form the core. Preferably, the differential pressure means comprises a blower 190a and a circulating blower 190b as shown in FIG. 14A. Blower 190a creates a vacuum on the side on which it communicates with duct 188 and a pressure on the side on which it communicates with duct 189 and duct 212 as shown in FIG. 14A. Circulating blower 190b enhances the flow of air from blower 190a into duct 186. The application of a vacuum to the stack provides a consistent, evenly distributed force to press the sheets of half-cell structure together to form an accurate core.

The purpose of end guide plates 176 is to prevent excess air flow at the ends, to register the ends of the assembled core for alignment with the next sheet of half-cell structure, and to avoid disturbing the ends of each sheet as it is lowered onto the core. Preferably, the surfaces of the end guide plates are roughened, i.e., roughened enough to oppose the vacuum forces applied to the sheets by vacuum source 190a. The roughened surfaces provide a friction force that opposes and balances the vacuum force on the cut ends of the sheet. One preferred end guide plate surface comprises a rough, cured silicone adhesive which is about 0.08 cm. thick. Another surface comprises a plurality of knurled strips running the length of the plate.

The apparatus further comprises heating means for heating the sheets while the sheets are being stacked. The heating means comprises a heating element disposed in at least one of the upper portion and the lower portion of the enclosure. A heating element 196 is shown in FIG. 14A disposed in lower portion 187. Lower portion 187 also includes a circulating fan 198 which pulls air down past heating element 196 and directs the flow against the bottom of enclosure 34. A heating element 464 is also disposed in duct 186, which maintains the heat in duct 186 and lower portion 187. In the preferred embodiment using the above-described adhesive system, heating element 464 maintains the temperature at about 170–190 degrees C. Maintaining this temperature also allows the adhesive to continue to cure and the air in the stack holder to remain dry to prevent moisture absorption by the sheet, which causes undesirable expansion of some of the materials from which the half-cell structure is formed.

In addition, the stacking apparatus of the present invention includes heating means for heating air leaking through the enclosure. The means for heating the air leaking through the enclosure preferably comprises a duct 189 as shown in FIG. 14A which is communication with upper portion 185 of the enclosure. Duct 189 has a low flow of air heated to about 170–190 degrees C. in a preferred embodiment and thus limits the inflow of unheated room air that would quench the sheet temperature. Duct 189 must include a heating element if air is drawn into this duct from the atmosphere. Alternatively, air may be re-circulated from heated duct 186, through duct 188, to duct 189, in which case duct 189 does not require a heating element and functions only as an air duct. A side panel 191 is provided on upper portion 185 to allow access for stacker arm 31 as each sheet is available for stacking. As shown in FIG. 14A, a gate 193 is provided on enclosure 34 at the junction of upper and lower portions 185 and 187, respectively, to adjust the amount of air that can freely flow from duct 189 into lower portion 187 and through the core. After each sheet of half-cell structure is placed on the core, the elevator is lowered by driven nut 182 until the top of the just-placed sheet is detected by a plurality of vertically stacked emitters 192 and receivers 194, which function as upper and lower sensors. The upper emitter and receiver are just uncovered and the lower emitter and receiver remain covered when control system 38 signals the elevator to stop. This is repeated for each sheet. As a result, the core is gradually lowered out of the air stream from duct 186.

By stacking in a heated enclosure, rapid adhesive curing as each sheet is stacked is ensured. Also, stacking in a heated enclosure keeps the core dimensionally stable, since sometimes moisture and temperature effect sheet dimensions significantly. Applying a vacuum while stacking results in a pressure differential between the top of the top sheet of the core and the rest of the core that presses and holds the just-placed sheet firmly on the core. This differential pressure ensures good contact between the peaks of the sheets of half-cell structure, so the first and second adhesive components can combine and cure to form a strong, reliable bond. Thus, stacking in a heated enclosure where a vacuum is applied achieves an accurate finished core without added edge-aligning dents or holes of the prior art that must be removed from the final product after bonding and before the final use thereof. The core, as it is assembled, is spongy in the vertical and machine directions and is rigid only in the transverse machine direction. As the height of the core increases, the vertical sponginess may increase. If the stacking forces and the half-cell alignment are not controlled carefully, deformation and mis-registration in the core make stack formation from individual sheets poor or impossible. The reduced pressure caused by the vacuum created in duct 188 provides the required stacking force control and also firmly presses the top sheet against the core to achieve good bonding contact as the adhesive components post-mix and start to set, accelerated by the elevated temperature of the air flow from duct 186.

After the core is fully formed, elevator 170 is raised, and a side door 200 provided on upper portion 185 of enclosure 34 is opened to permit removal of the completed core. Stacking apparatus 29 is then shut down while the core is removed. Platform 172, which comprises a foraminous block, such as a dummy piece of honeycomb, is prepared for the next core by placing a flat sheet of paper or a thin stainless steel sheet on the top of the foraminous block. This block allows stable air flow from duct 186 to duct 188 at start-up. When the first sheet of half-cell structure is placed on the top of the block by stacker arm 31, it sticks to the sheet placed on top of the block, which ensures that dimensional accuracy is maintained for alignment with the next sheet of half-cell structure.

After removal from the stack holder, the completed core may be placed in an oven for further curing to achieve maximum bond strength. An alternative to shutting down the stacking apparatus for core removal is to provide two stack holders and to alternate stacking between them. Another alternative is to replace the elevator platform with a long heated enclosure with moving endless walls and to provide vacuum and thermal seals around the exiting honeycomb core so it can be continuously removed and periodically cut off from the already formed core.

FIG. 15 shows an enlarged cross-sectional view of stack holder 32 of FIG. 14A in order to more completely explain how the differential pressure source is applied to press the sheets of the core together. Illustrated in FIG. 15 are a down-flow chamber 202 provided in upper portion 185, a cross-flow chamber 204 provided between ducts 186 and 188 and a holding chamber 206 provided below ducts 186 and 188. Cross-flow chamber 204 and holding chamber 206 are part of lower portion 187 of enclosure 34. The assembled core, which is shown supported on elevator platform 172 in FIG. 14A, is positioned with the top sheet of the core outside cross-flow chamber 204 in stack holder 32. The pressure, P-lo, in the cross-flow chamber 204, is below the pressure, P-hi, in down-flow chamber 202. Core 30 passes through an opening 214 formed between down-flow chamber 202 and cross-flow chamber 204. A plate 195 as shown in FIGS. 14B and 15 is provided in enclosure 34. Plate 195, in addition to adjustable gate 193 and end guide plates 176, restrict fluid flow and define opening 214 around the periphery of the top of the core. Air flows from down-flow chamber 202 to cross-flow chamber 204 through opening 214 all around the periphery of core 30, so the pressure in enclosure 34 changes from P-hi in down-flow chamber 202 to P-lo in cross-flow chamber 204 and holding chamber 206. This pressure differential from P-hi to P-lo produces a load on the top sheets of the core, which load is transmitted through the entire core. The force resulting from the differential pressure is continuously exerted on the remaining core to hold it together during heating and curing in the stack holder.

According to the present invention, there is provided a process of making a hexagonal-cell honeycomb core from a half-cell structure. The process comprises the steps of stacking the half-cell structure so that as one sheet of half-cell structure is placed on the top of a stack comprising at least one sheet of half-cell structure, the peaks of one sheet contact the peaks of an adjacent sheet and restricting the flow of air around the periphery of the stack, such as with enclosure 34. The stacking step includes stacking the sheets in an enclosure, such as enclosure 34, that restricts the flow of air past the top of the stack into the enclosure. A differential pressure force is then applied to the sheets, such as by blower 190a, during the stacking step to press the sheets together, thereby forming the core. The differential pressure force applied to the sheets may be opposed at the ends of the sheets, as by roughened guide plates 176. The process further includes the step of passing a cross-flow of hot gas, such as through ducts 186 and 188, through the stack during the stacking step to rapidly heat the sheets. The process also further includes the step of heating the air passing into the enclosure surrounding the core, such as through duct 189 and upper portion 185.

In accordance with the present invention, there is provided a process of transferring a plurality of sheets of half-cell structure. The process comprises the steps of contacting the valleys on one side of the sheets of the half-cell structure with a plurality of spaced bars, such as bars 162 and 163, formed on a transfer head, such as transfer head 31b, and holding the structure against the bars. Preferably, the bars contact the entire valley of the half-cell structure. A differential pressure force, such as from vacuum source 167, is applied to the sheets through ports, such as 164 and 165, in the bars. Alternatively, the vacuum may be applied through the spaces between the bars, such as spaces 161. The peaks of one side of the half-cell structure are placed in the space between the bars, where the space has a width which is about the distance between adjacent valleys, and the space is deeper than the height of the peaks. The sheets may alternatively be adhered to the spaced bars with a temporary adhesive applied to the bars; when the sheet is released from the bars, the valley of the sheet is separated from the adhesive. Alternatively, the sheets may be adhered to the spaced bars with a plurality of clamps and when the sheet is released from the bars, the valley of the sheet is separated from the clamps. The transfer head and the layer are moved from pick-up position 344 in FIG. 14A to deposit position 345 as shown in FIG. 14A spaced from the pick-up position. The sheet is then released from the bars.

Figure 16:
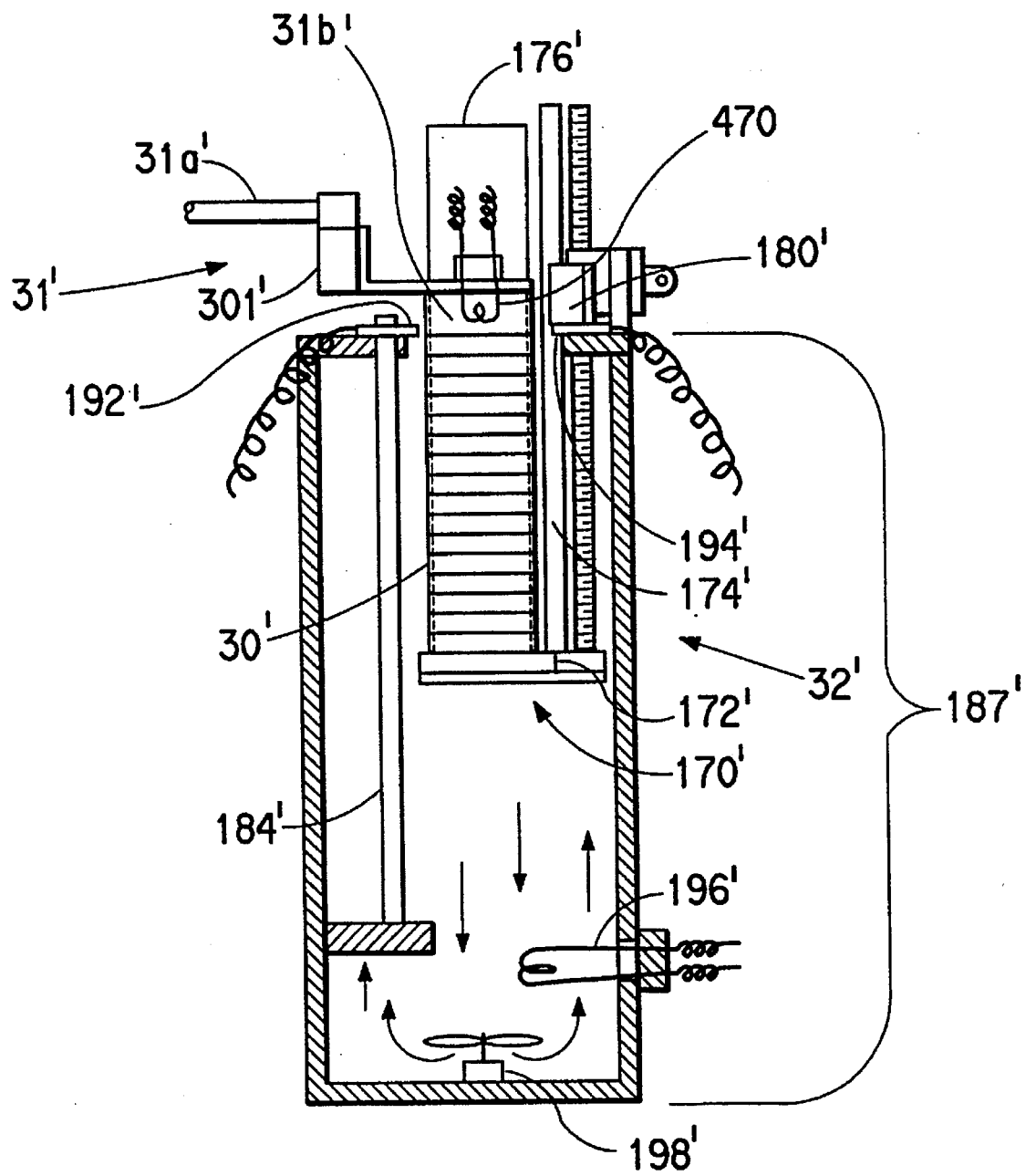
FIG. 16 is a partial cross-sectional view of an alternate embodiment of the stack holder that uses a heated transfer head on the stacker arm.

An alternate embodiment of the present invention is shown in FIG. 16. Whenever possible in FIG. 16, elements like the elements of the embodiments of FIGS. 1–15 will be used, but will be designated with a prime. In the embodiment of FIG. 16, a differential pressure source is not used in the stack holder to press the top sheet to the core. Rather, the transfer head is allowed to dwell with the top sheet of the core for a brief time until the adhesive starts to gel before releasing the top sheet. A stacking apparatus is shown in FIG. 16 and includes a stack holder 32' and a stacker arm 31'. Stacker arm 31' includes an extension rod 31a', a transfer head 31b' and a two-axis shift mechanism 301' which function as described above with respect to FIGS. 10B, 10C and 14A. The transfer head of the embodiment of FIG. 16 may include heating means for heating the bars. Preferably, the heating means comprises a heating coil 470 as shown in FIG. 16. The heating means may also comprise other types of heat sources, including, but not limited to, a radiant heater or a resistance heater. Alternatively, heating tape may be wrapped around the periphery of the bars of the transfer head for heating the bars.

Stack holder 32' also comprises a lower portion 187' of the enclosure for the stack holder. Disposed in the bottom of lower portion 187' is a heating element 196' and a circulating fan 198' for conditioning the air in the stack holder. An elevator 170' for raising and lowering the core is provided in lower portion 187' which includes a platform 172' and at least one guide rod 174' disposed in a linear bearing 180' and at least one auxiliary guide rod 184'. The elevator functions as described above with respect to FIGS. 14A, 14B and 15. An emitter 192' and a receiver 194' are provided adjacent core 30' below linear bearing 180' for sensing the position of the core. Preferably, at least one end guide plate 176' is provided for ensuring accurate alignment of the sheets as they are stacked.

In the embodiment of FIG. 16, transfer head 31b' is allowed to dwell with the top sheet in contact with the core for a brief time until the adhesive starts to gel before releasing the top sheet. The head dwell ensures that the position of the top sheet on the core is retained and will not shift as the core is lowered on the elevator as the adhesive continues to cure. Transfer head 31b' may also travel downwardly with the elevator before releasing the top sheet on the core. The head is preferably heated, otherwise it acts as a heat sink for the sheet. Alternatively, when the adhesive system used with the embodiment of FIG. 16 does not require heat for curing and maintaining the half-cell structure in a dry state so that it will not expand, the transfer head of FIG. 16 may be used without heat. Also alternatively, the head could be a thermal insulator that would not conduct heat away from the sheet. The adhesive, whether a one-component or a two-component system, is preferably wet and sticky when the top sheet contacts the core to ensure a large adhesive contact area is quickly formed. However, when the transfer head of FIG. 16 is used, the need for a sticky adhesive for maintaining an accurate sheet position is decreased.

The operation of the cutting apparatus and the stacking apparatus of the system of the present invention as shown in FIGS. 1–15 will now be described with respect to FIG. 17. In normal operation, the half-cell forming apparatus and the adhesive applying apparatus of the present invention run continuously and at the same line speed. In describing the timing diagram of FIG. 17, it will be appreciated that there are many components involved and that there may be several events for each component, so that many events occur at the same time. This is done to optimize the cycle time of the system; each could be done sequentially, but more time would be required.

FIG. 17 shows several cycles of operation, starting at an arbitrary zero time when conveyor 28 begins to advance a sheet-length of the continuous half-cell structure. One complete cycle of operation consists of two consecutive sheet advances, one where the cut occurs on one side, such as the upstream side, of a conveyor platen bar, and one where the cut occurs on the other side, such as the downstream side, of another bar. This requires a lateral shift of one-half the pitch of the half-cell structure in transfer head 31b to pick up and stack the sheets. The typical time for a repeatable cycle of operation is best referenced to the transfer head shift event and is shown at 216 in FIG. 17. This cycle time is about 3.8 time units on the diagram of FIG. 17.

FIG. 17 will be described looking first at one time unit interval and examining the components and the events associated therewith generally from top to bottom of the diagram. First, from time 0 to time 1, the following events occur. The conveyor advances the distance of one sheet of half-cell structure and stops. The conveyor then starts to dwell, waiting for the blade to cut a sheet from the continuous supply of half-cell structure and the transfer head to pick up the sheet. The blade stays in a retracted position, waiting for the conveyor advance to be completed. Vacuum sources 341a–c of the conveyor of the cutting apparatus stays on to securely hold the advanced half-cell structure before pick-up by transfer head 31b. The conveyor air from pressure sources 336a–c for transferring a cut sheet to transfer head 31b stays off. The transfer head, which picked up the last sheet at the downstream cut, stays at that shift position for stacking. Enclosure side panel 191 goes from closed to open to admit the transfer head inside enclosure 34 for stacking.

The transfer head, which is holding the last sheet, continues moving to stack holder 32 and arrives there while conveyor 28 is still advancing. Elevator 170 continues moving down until the earlier stacked sheet is at the proper elevation for stacking the next sheet; the elevator dwells at this elevation. When the transfer head is at stack holder 32, and elevator 170 is at the dwell event, the transfer head goes to the down position to place the sheet on top of the stack. When the transfer head is down, vacuum source 167, which had been holding the sheet securely on the head, is turned off. At the same time the transfer head air from pressure source 168 is turned on to positively release the sheet from the head, which is still down. The transfer head goes to the up position while the transfer head vacuum remains off and the transfer head air remains on. The transfer head, having released the sheet in stack holder 32, starts to move from stack holder 32 to conveyor 28, which may be just before the conveyor reaches the dwell event. Elevator 170, having received the sheet from the transfer head, starts moving down.

The following events occur from time 1 to time 2 in FIG. 17. Conveyor 28 stays at the dwell event while blade 157 and transfer head 31b interface with the half-cell structure on the conveyor. The blade extends across the half-cell structure on the conveyor, thereby cutting through the structure to cut off a sheet. The blade then retracts back through the cut to return to a retract event position, out of the way of the conveyor bars and the transfer head. The transfer head starts to shift to an upstream event position while the transfer head is moving to the conveyor, since the sheet to be picked up was just cut at the upstream side of a conveyor bar. This conveyor bar is one-half of the pitch of the half-cell structure away from the position of the bar supporting the sheet adjacent the previous cut. Side panel 191 closes as soon as the transfer head is clear as it moves to the conveyor. As the transfer head is moving to the conveyor from the stack holder, transfer head pressure source 168 is turned off, and transfer head vacuum source 167 remains off. The transfer head arrives at the conveyor over the cut sheet after the blade has retracted. The head has shifted so the transfer head bars are positioned over the spaces on the conveyor platens. Transfer head vacuum source 167 is then turned on. Vacuum sources 343b and 343c are then turned off, and pressure sources 336a–c are turned on progressively from one end of the sheet on the conveyor to the other to thereby progressively transfer the sheet from the conveyor to the transfer head as described in detail above. Transfer head vacuum source 167 stays on to hold the sheet, which has been transferred from the conveyor. The transfer head pressure source stays off. The transfer head, after receiving the sheet from the conveyor, starts to move to the stack holder. The conveyor then starts to advance.

The above description explains about one half-cycle of operation; a full cycle is a repeat of this half-cycle, except that the transfer head shift is different. The full cycle keeps repeating until there are sufficient sheets stacked to complete the core, which can be determined by having distributed control system 38 keep track of how many sheets have been stacked. When the core is completed, the stacking apparatus is shut off, the enclosure side panel raised, and the stacker elevator raised so the completed core may be removed from the stack holder.

Other embodiments of the invention will be apparent to those skilled in the art from consideration of the specification and practice of the invention disclosed herein. It is intended that the specification be considered as exemplary only, with a true scope and spirit of the invention being indicated by the following claims.

We claim:

1. A transfer head for holding at least one sheet of half-cell structure, the half-cell structure having a plurality of peaks and valleys and a diagonal surface between each consecutive peak and valley, comprising:

(a) a plurality of support bars for supporting the half-cell structure;

(b) at least one space formed between each support bar, wherein the width of each space is about the distance between adjacent valleys of the half-cell structure and the depth of the space is greater than the height of the peaks;

(c) an extension rod attached to the support bars; and (d) a shift mechanism for moving the transfer head up and down and side to side relative to the rod.

2. The transfer head as claimed in claim 1, further including a differential pressure system for holding the sheets against the support bars and for disengaging the sheets therefrom.

3. The transfer head as claimed in claim 2, wherein the bars include ports for applying the differential pressure system to the sheets.

4. The transfer head as claimed in claim 1, further including heating means for heating the support bars.

5. A process of holding a sheet of half-cell structure, the structure having a plurality of peaks and valleys and a diagonal surface between each consecutive peak and valley, comprising the steps of:

(a) contacting the valleys on one side of the structure with a plurality of spaced support bars formed on a transfer head;

(b) holding the structure against the support bars;

(c) moving the transfer head and the structure up and down and side to side relative to an extension rod attached to the transfer head from a pick-up position where the transfer head picks up a sheet of the structure from a conveyor to a deposit position spaced from the pick-up position; and (d) releasing the structure from the support bars.

6. The process as claimed in claim 5, further including heating the support bars.

7. The process as claimed in claim 5, wherein the contacting step includes placing the peaks of the one side of the sheet in the space between the support bars, wherein the width of the space is about the distance between adjacent valleys and the depth of the space is greater than the height of the peaks.

8. The process as claimed in claim 5, wherein the holding and releasing steps comprise applying a differential pressure system to the structure through each support bar.

\* \* \* \* \*

UNITED STATES PATENT AND TRADEMARK OFFICE
CERTIFICATE OF CORRECTION

PATENT NO.  : 5,616,204
DATED       : April 1, 1997
INVENTOR(S) : Pui-Lin et al. (corrected)

It is certified that error appears in the above-identified patent and that said Letters Patent is hereby corrected as shown below:

Title page, Item "[75] Inventors: James J. Duffy, Newark; Birol Kirayoglu, Wilmington; Pui-Yan Lin; Robert A. Marin, both of Hockessin, all of Del.; Robert J. Santucci, West Chester, Pa" should read:

Item --[75] Inventors: Pui-Yan Lin; Robert A. Marin, both of Hockessin, Del.; Robert J. Santucci, West Chester, Pa--

Signed and Sealed this

Thirtieth Day of December, 1997

*Attest:*

BRUCE LEHMAN

*Attesting Officer*   Commissioner of Patents and Trademarks